(12) United States Patent
Yokoi

(10) Patent No.: US 7,730,865 B2
(45) Date of Patent: Jun. 8, 2010

(54) ENGINE AIR INTAKE ARRANGEMENT FOR A VEHICLE

(75) Inventor: Masato Yokoi, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 770 days.

(21) Appl. No.: 11/623,700

(22) Filed: Jan. 16, 2007

(65) Prior Publication Data

US 2007/0175431 A1 Aug. 2, 2007

(30) Foreign Application Priority Data

Jan. 17, 2006 (JP) ............... 2006-009139
Sep. 20, 2006 (JP) ............... 2006-253641

(51) Int. Cl.
*F02M 35/10* (2006.01)

(52) U.S. Cl. .................. 123/184.55; 123/184.21

(58) Field of Classification Search ............ 123/184.21, 123/184.55
See application file for complete search history.

(56) References Cited

U.S. PATENT DOCUMENTS

| 4,543,918 A | 10/1985 | Ma |
| 4,759,320 A | 7/1988 | Fuji et al. |
| 4,890,586 A | 1/1990 | Fuji et al. |
| 5,740,770 A | 4/1998 | Morota |
| 6,408,810 B1 | 6/2002 | Leipelt et al. |
| 7,299,688 B2 | 11/2007 | Salvisberg |
| 7,331,332 B2 | 2/2008 | Baumann et al. |
| 2003/0051710 A1* | 3/2003 | Mengoli ................. 123/184.55 |
| 2004/0216721 A1 | 11/2004 | Nagashii et al. |
| 2005/0045147 A1* | 3/2005 | Ishikawa et al. ......... 123/198 E |
| 2006/0288673 A1 | 12/2006 | Wimmer |
| 2007/0175430 A1 | 8/2007 | Yokoi |
| 2007/0175431 A1 | 8/2007 | Yokoi |

FOREIGN PATENT DOCUMENTS

| JP | 63-182229 | 7/1988 |
| JP | 63-177627 | 11/1988 |
| JP | 02-223632 | 9/1990 |
| JP | 09-100720 | 4/1997 |

\* cited by examiner

*Primary Examiner*—Noah Kamen
(74) *Attorney, Agent, or Firm*—Keating & Bennett, LLP

(57) ABSTRACT

A vehicle, such as a motorcycle, having an arrangement that inhibits the reduction of the fuel tank volume disposed to the rear of a moveable funnel that forms a portion of a variable length air intake. The vehicle includes an engine having an intake port. A fixed funnel introduces air to the intake port of the engine and a moveable funnel is position on the inlet side of the fixed funnel to selectively cooperate with the fixed funnel to deliver air to the intake port of the engine along with the fixed funnel. A parallel linkage moveably supports the moveable funnel. A fuel tank is disposed to the rear side of the moveable funnel and a motor that drives the parallel linkage is disposed on the opposite side to the fuel tank from the moveable funnel.

17 Claims, 23 Drawing Sheets

[Fig. 1]
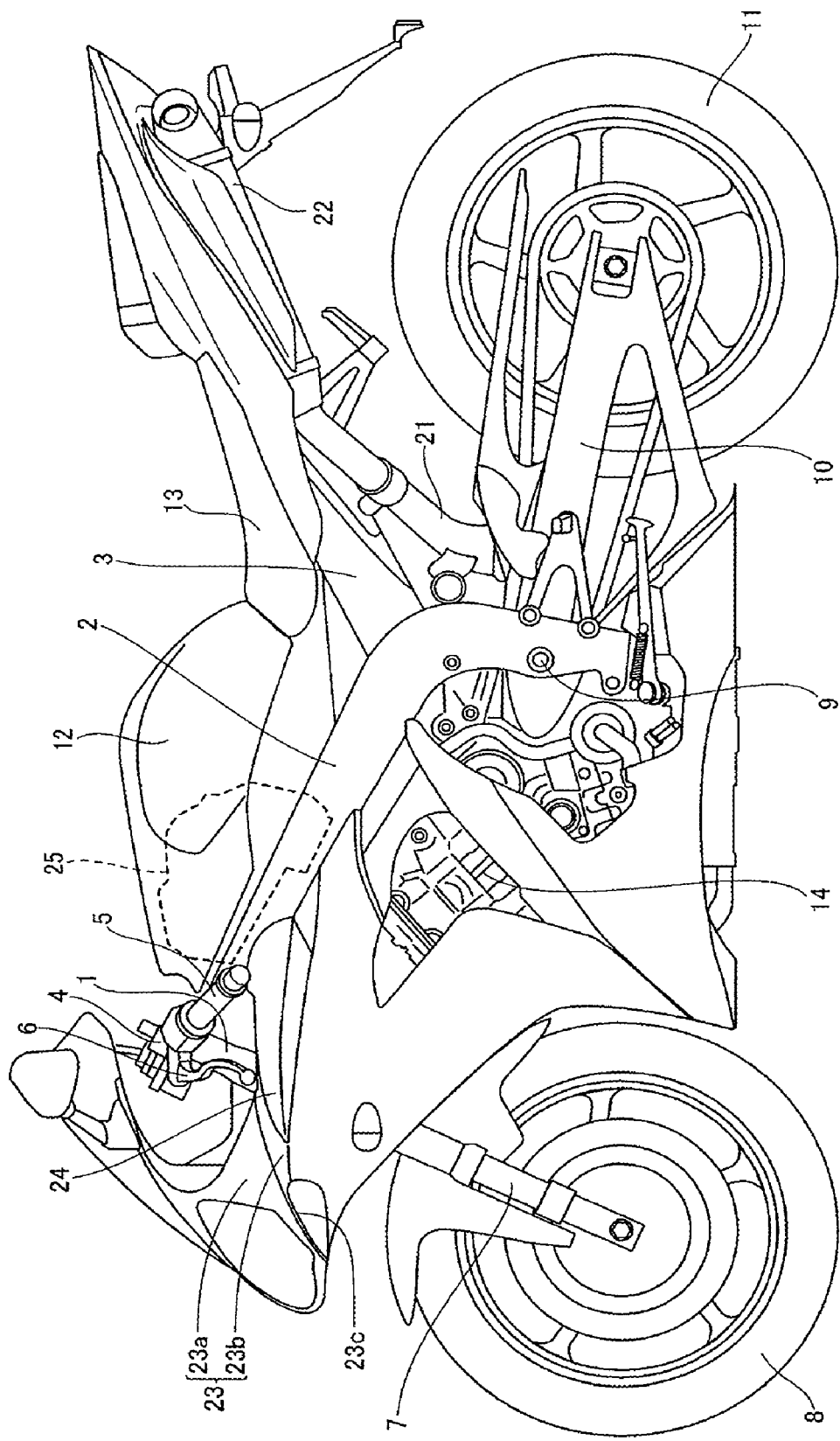

[Fig. 2]
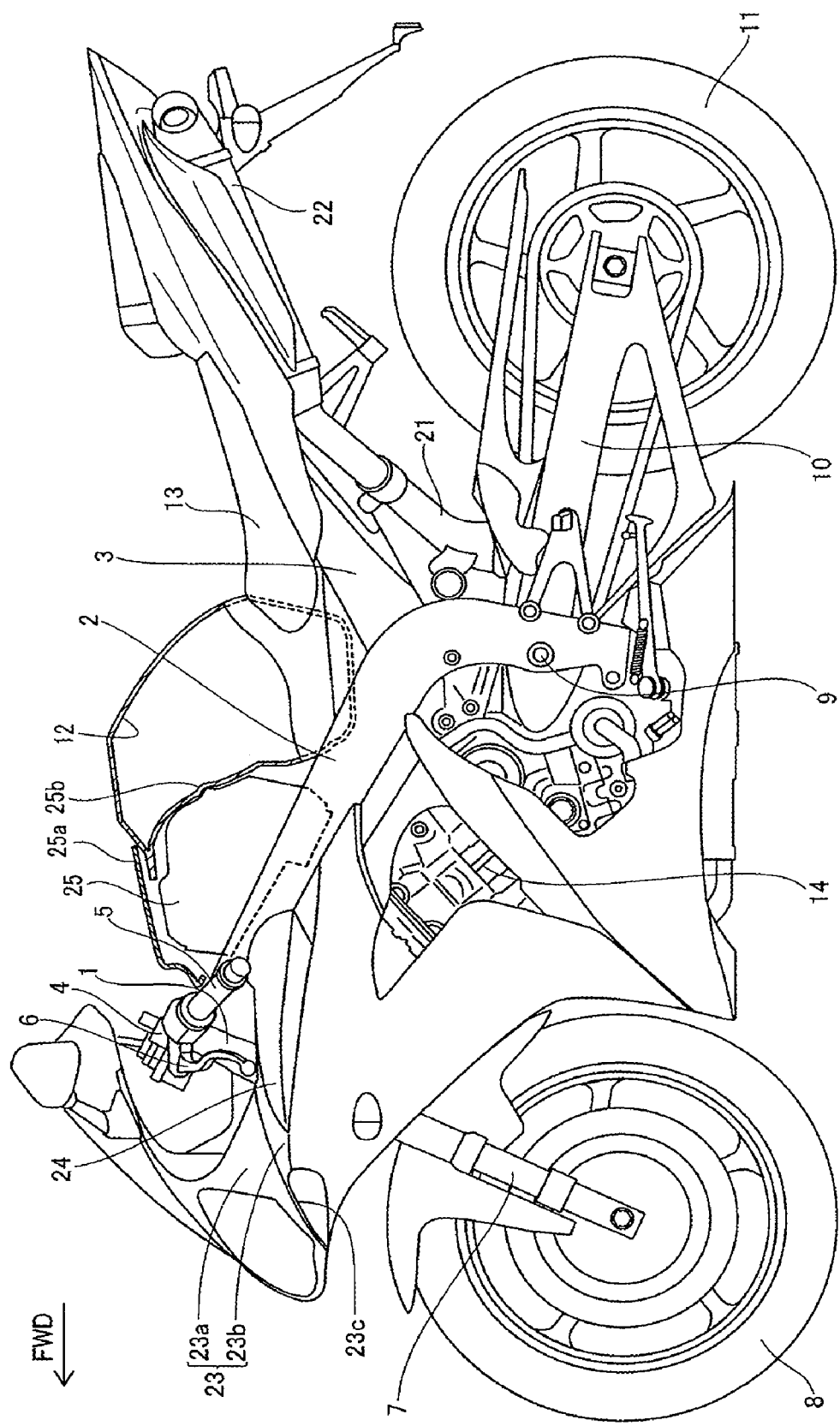

[Fig. 3]
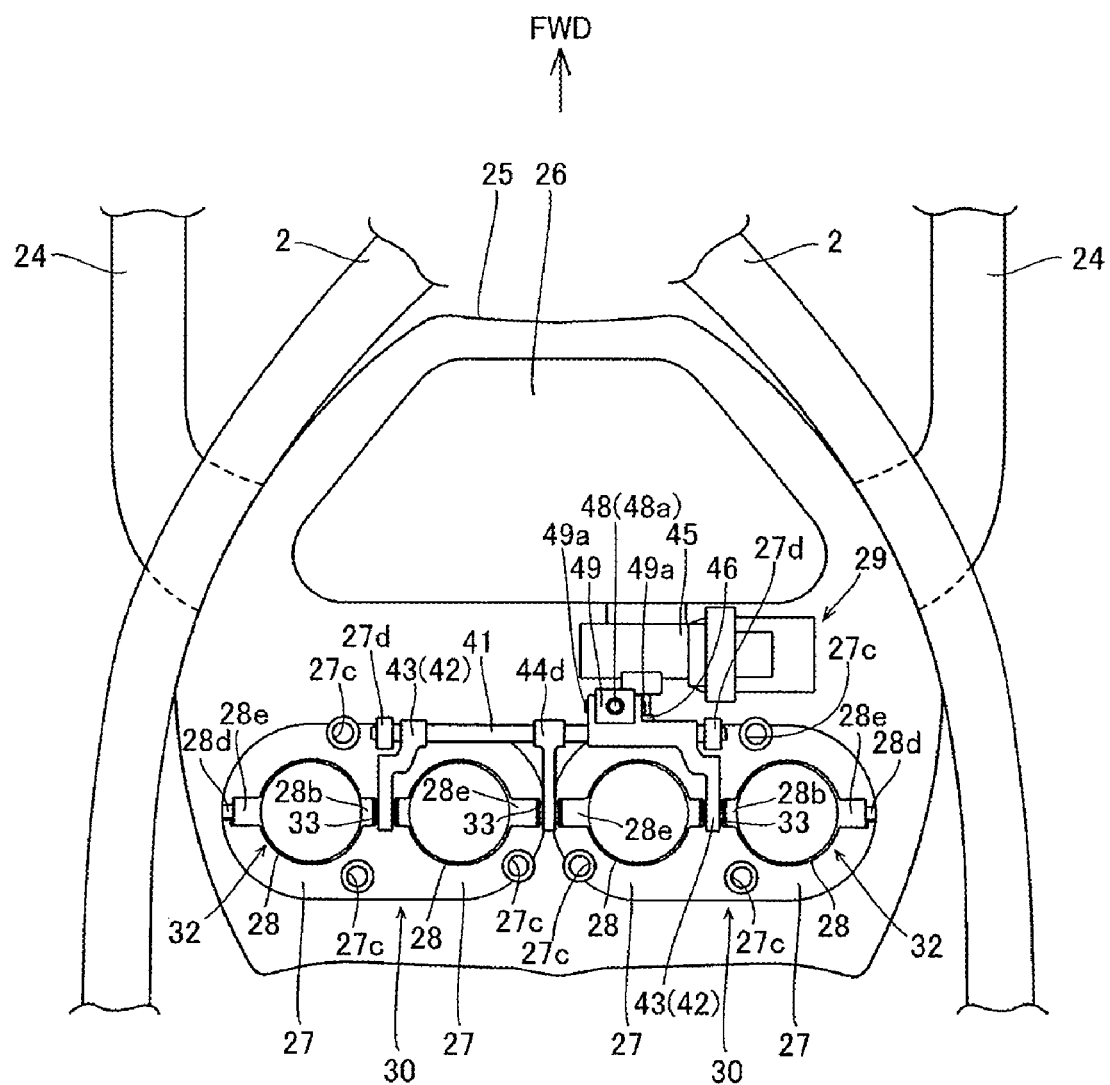

[Fig. 4]
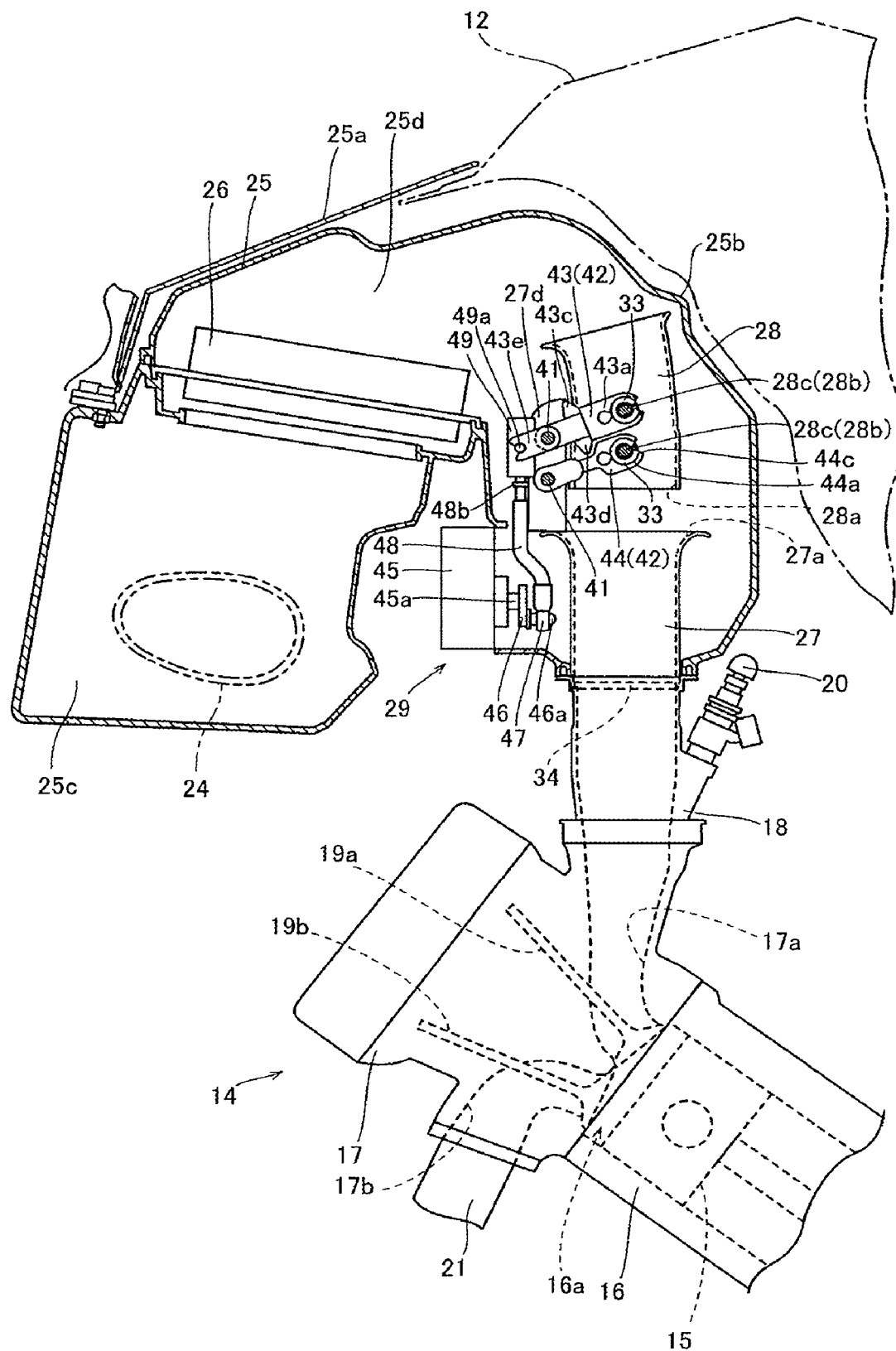

[Fig. 5]
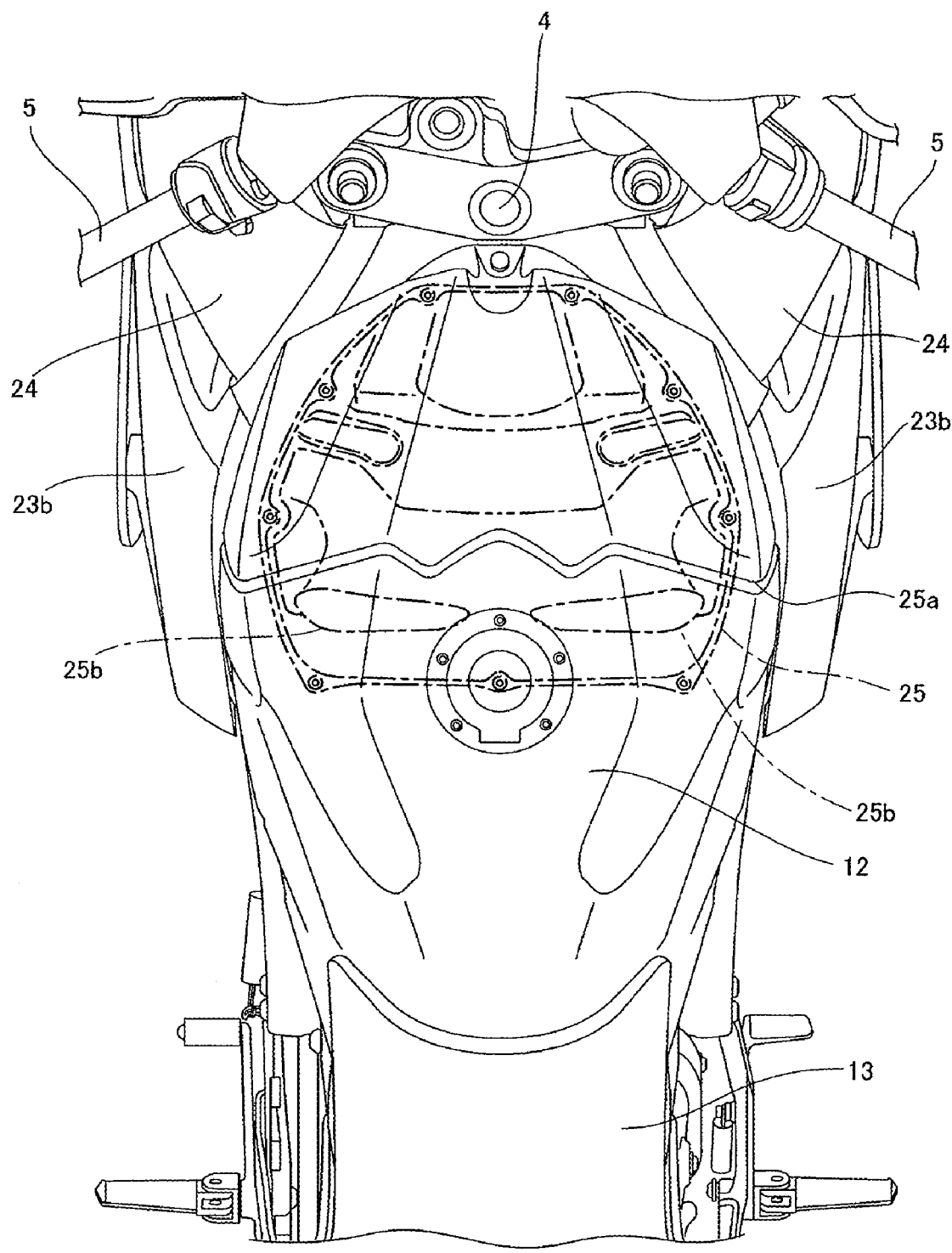

[Fig. 6]
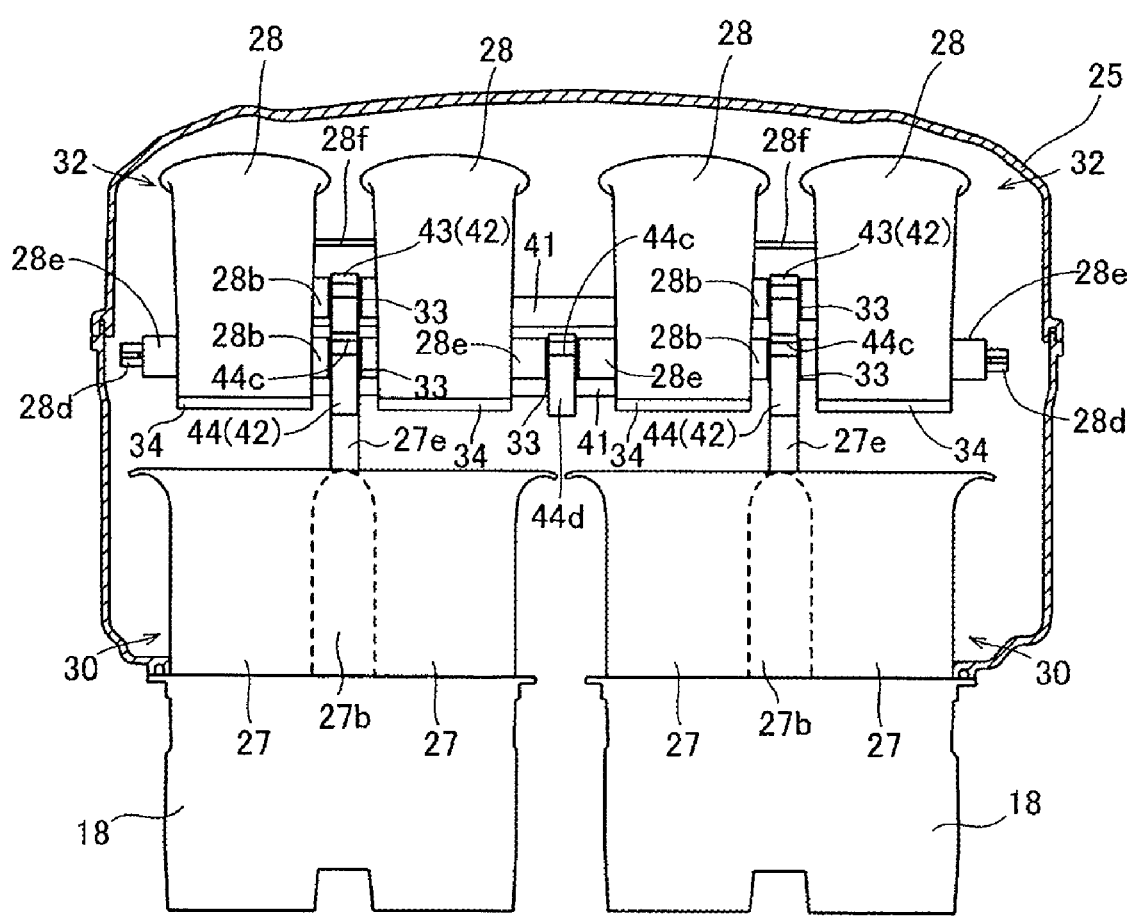

[Fig. 7]
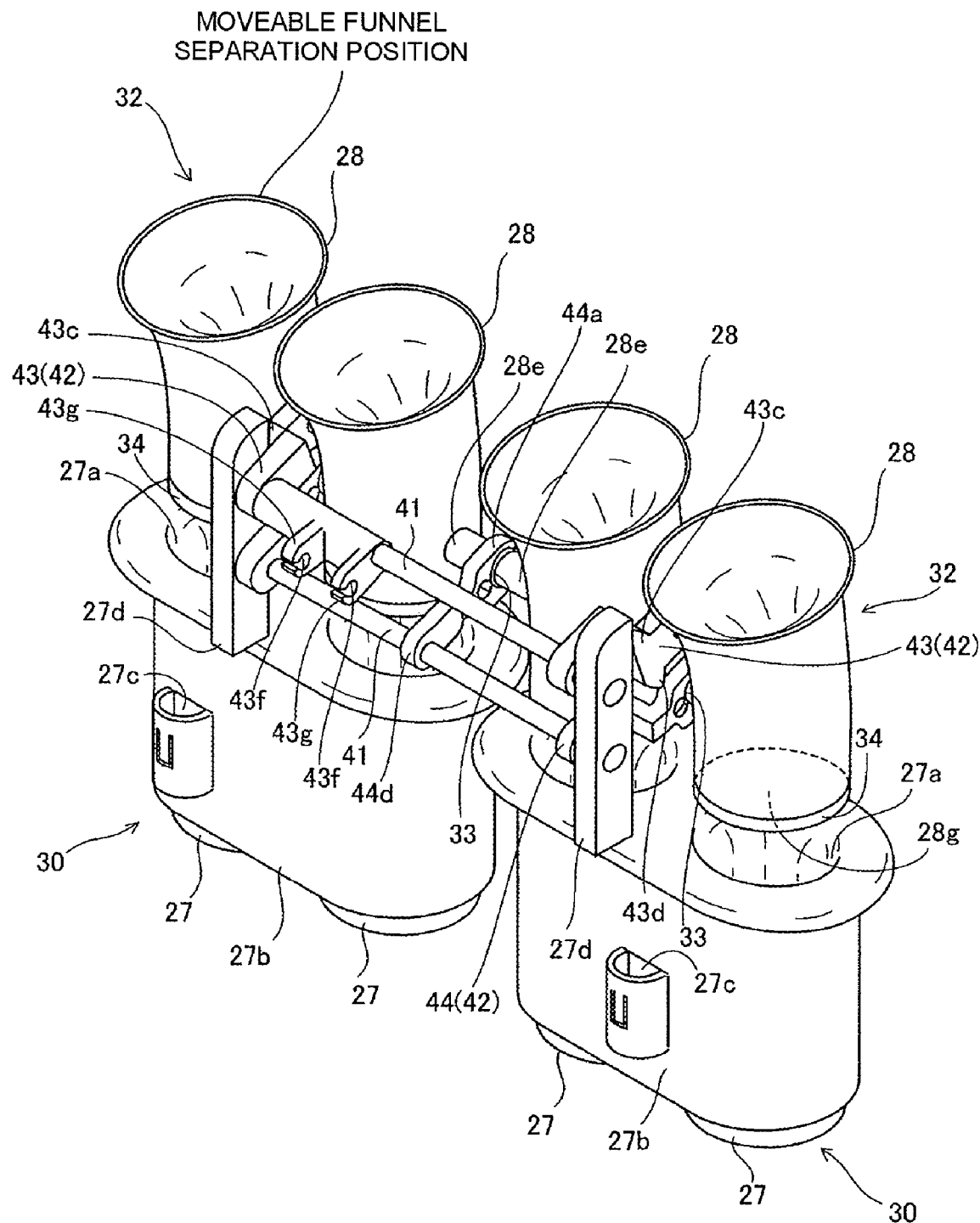

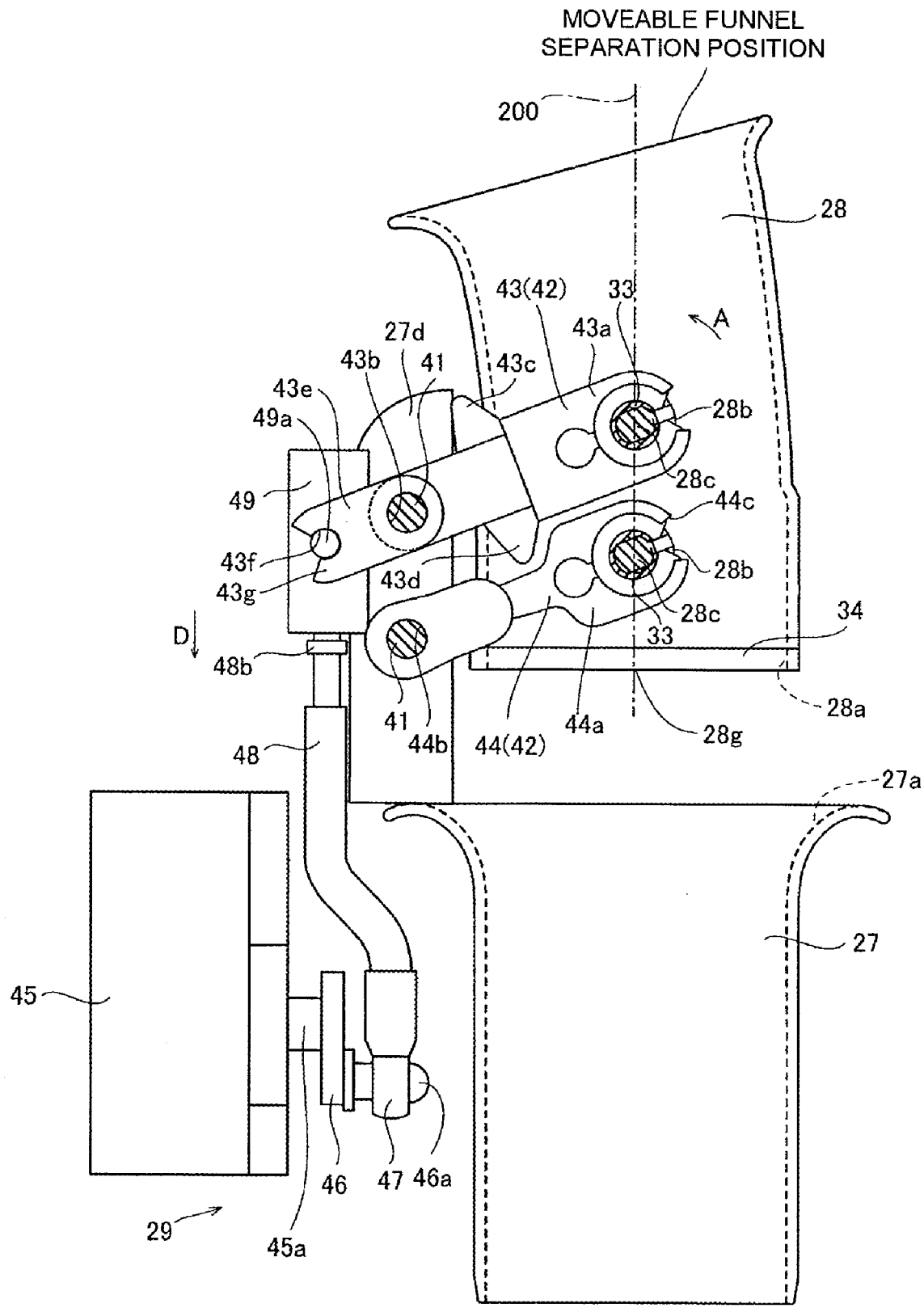
[Fig. 8]

[Fig. 9]
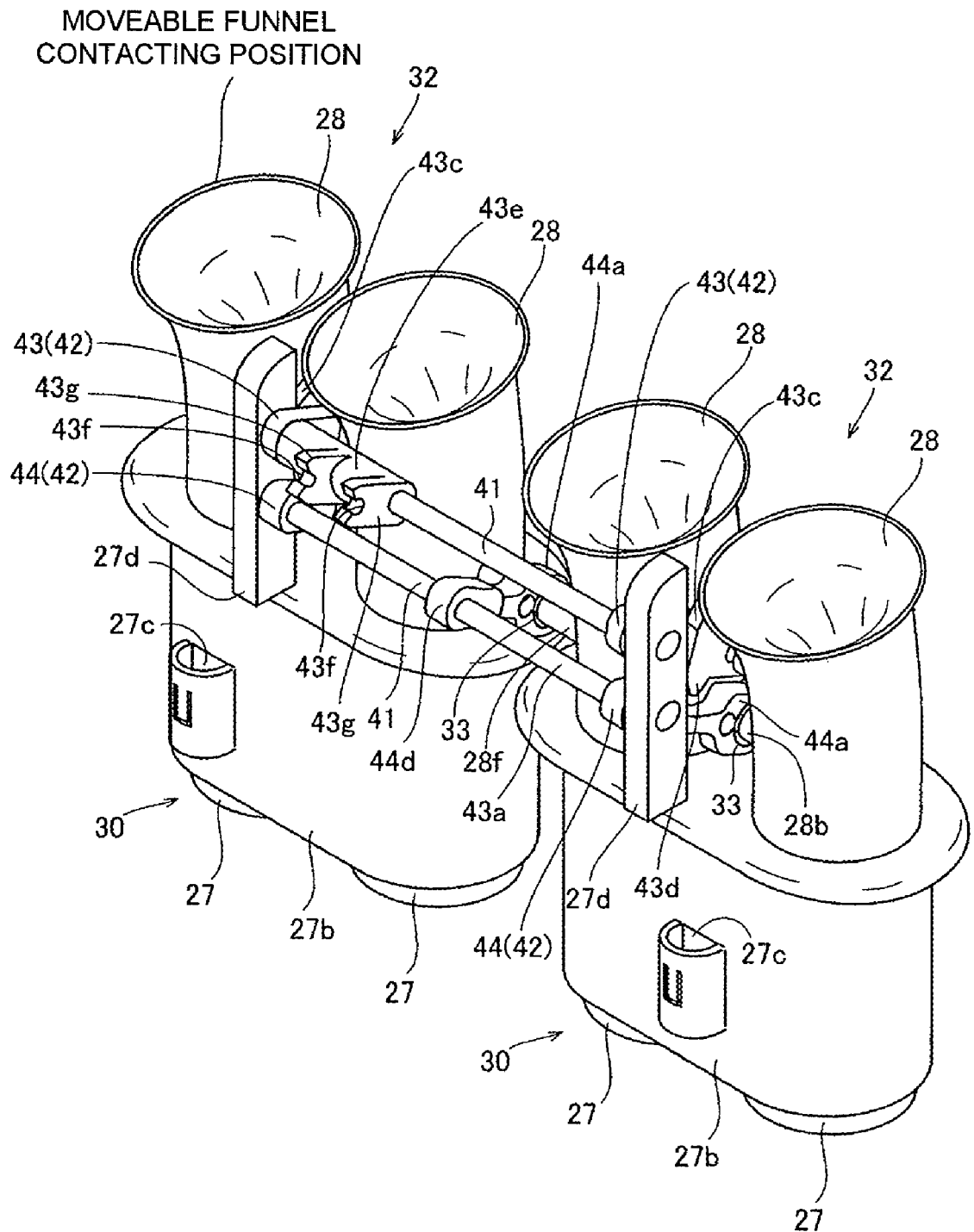

[Fig. 10]
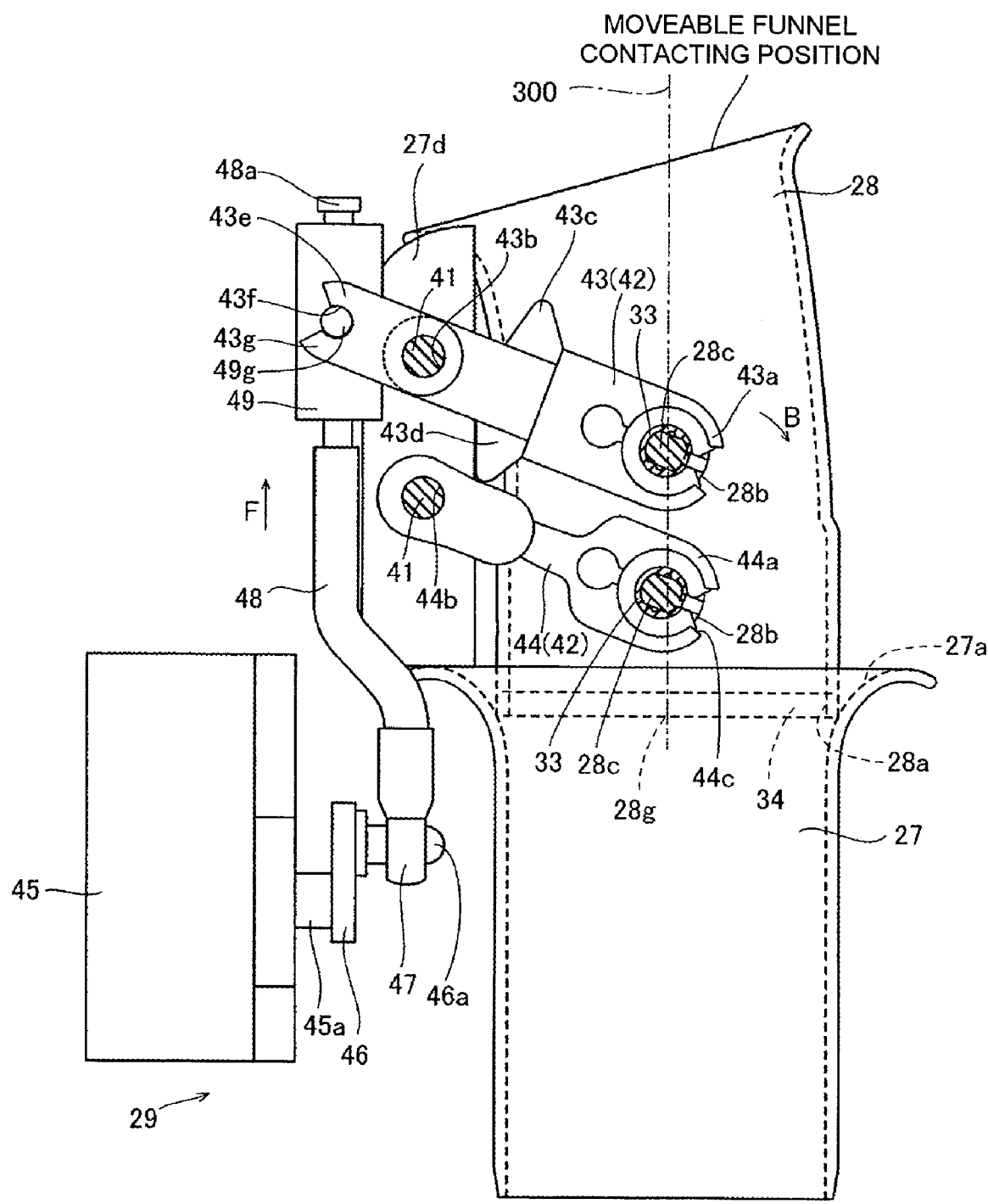

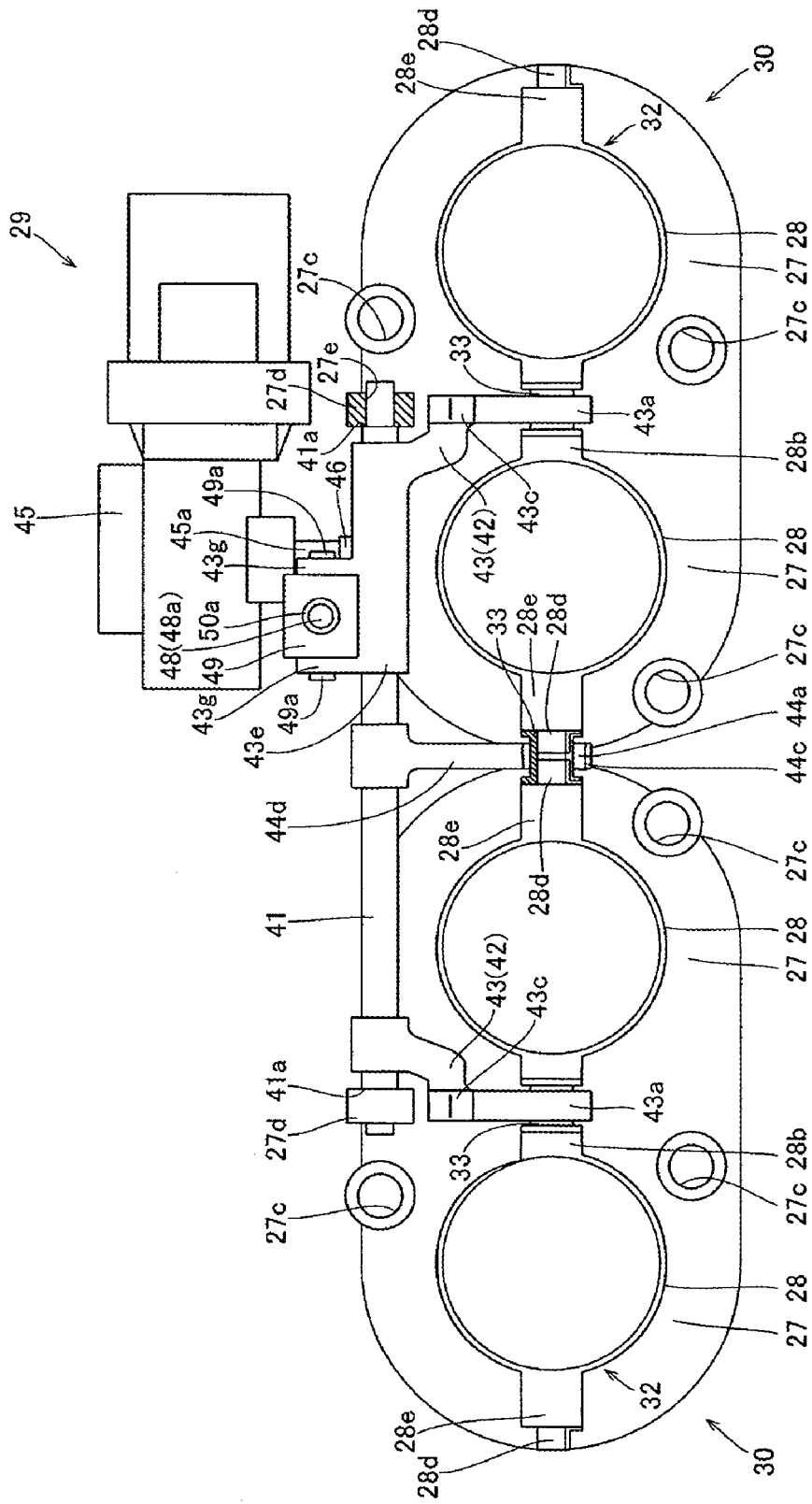
[Fig. 11]

[Fig. 12]
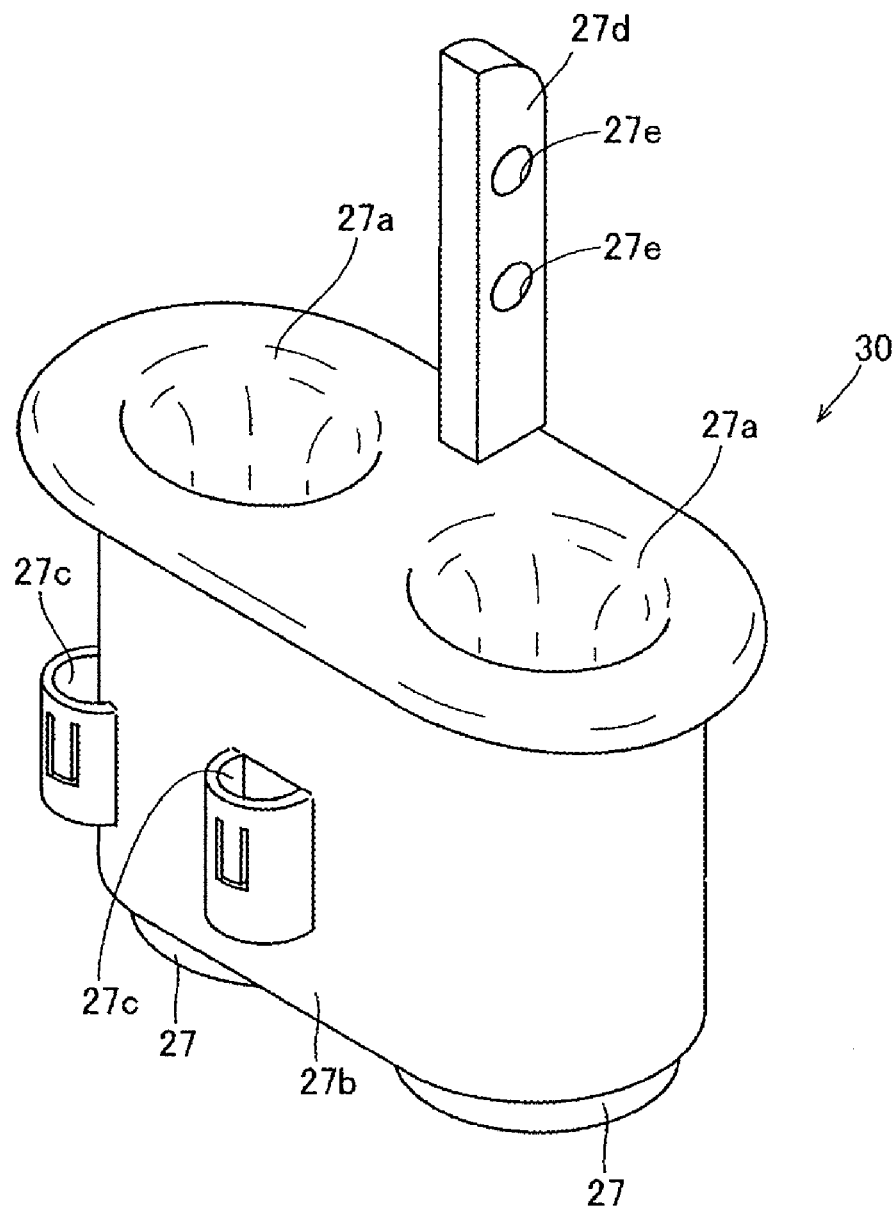

[Fig. 13]
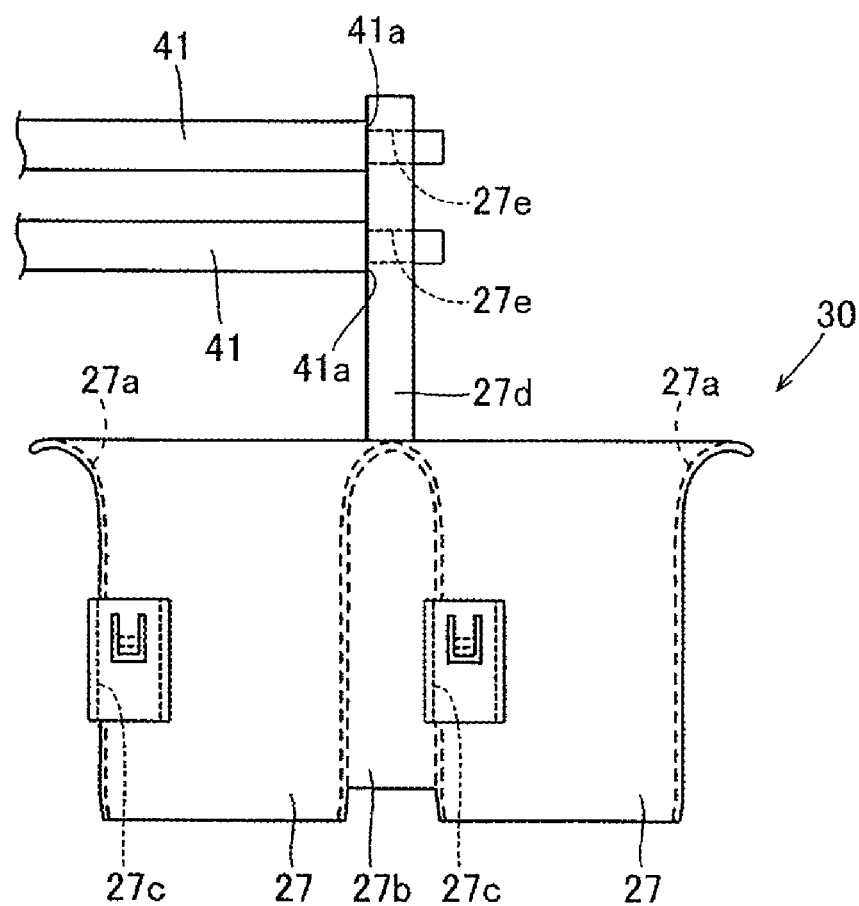

[Fig. 14]
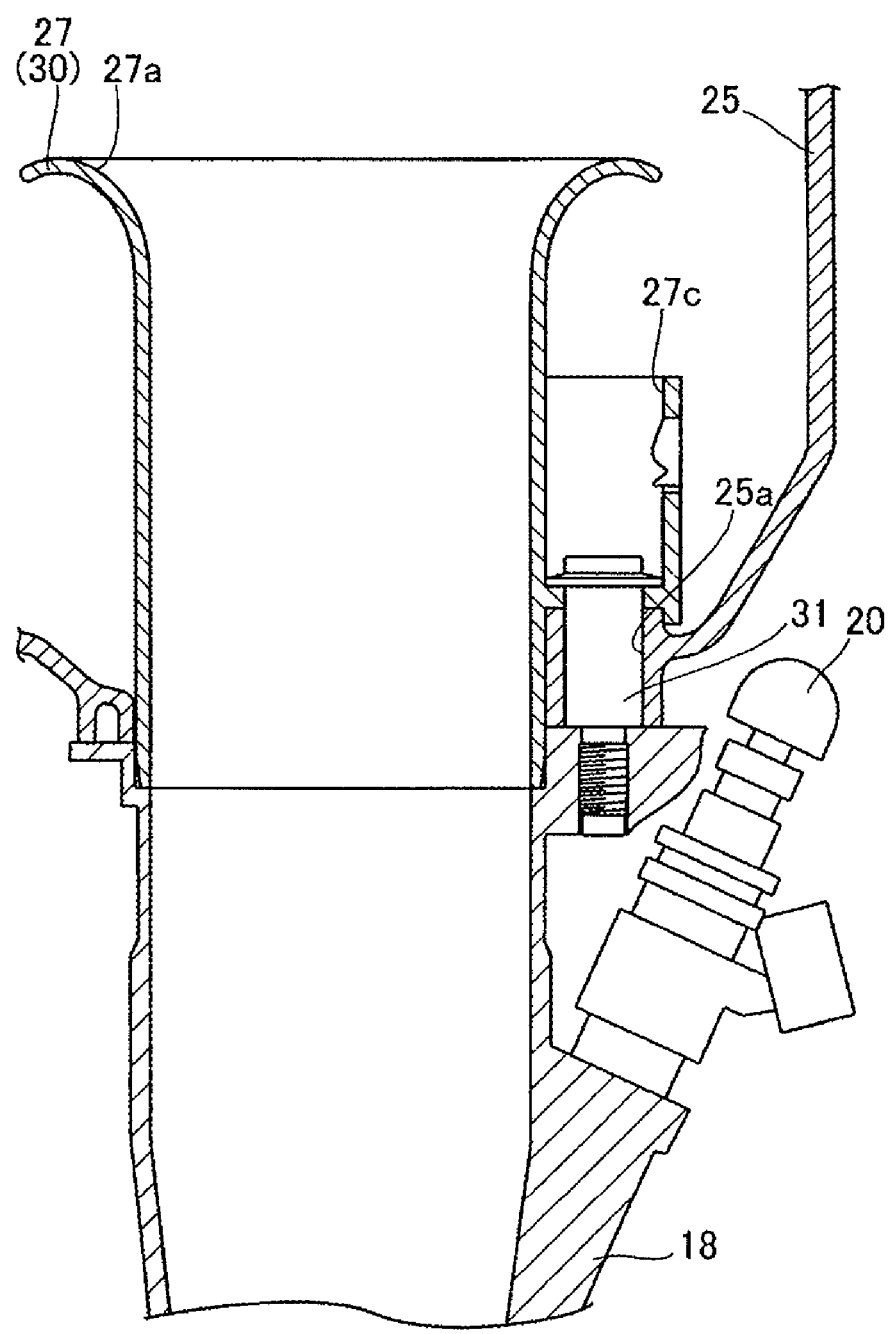

[Fig. 15]
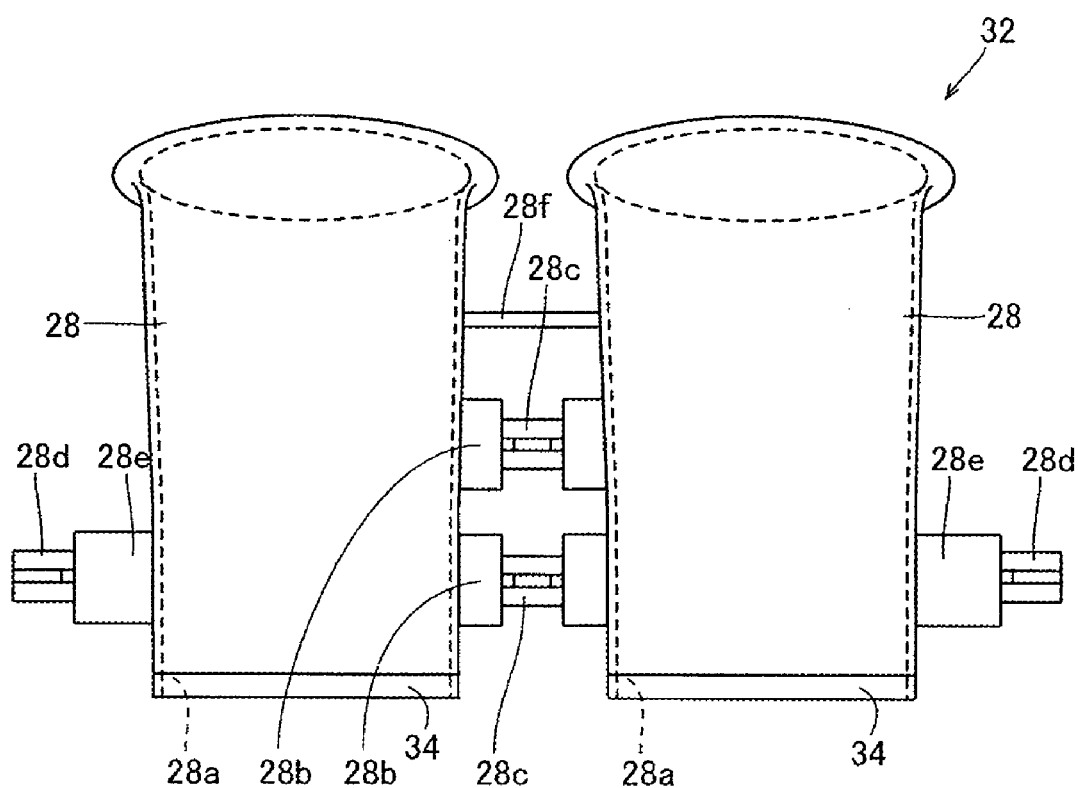

[Fig. 16]
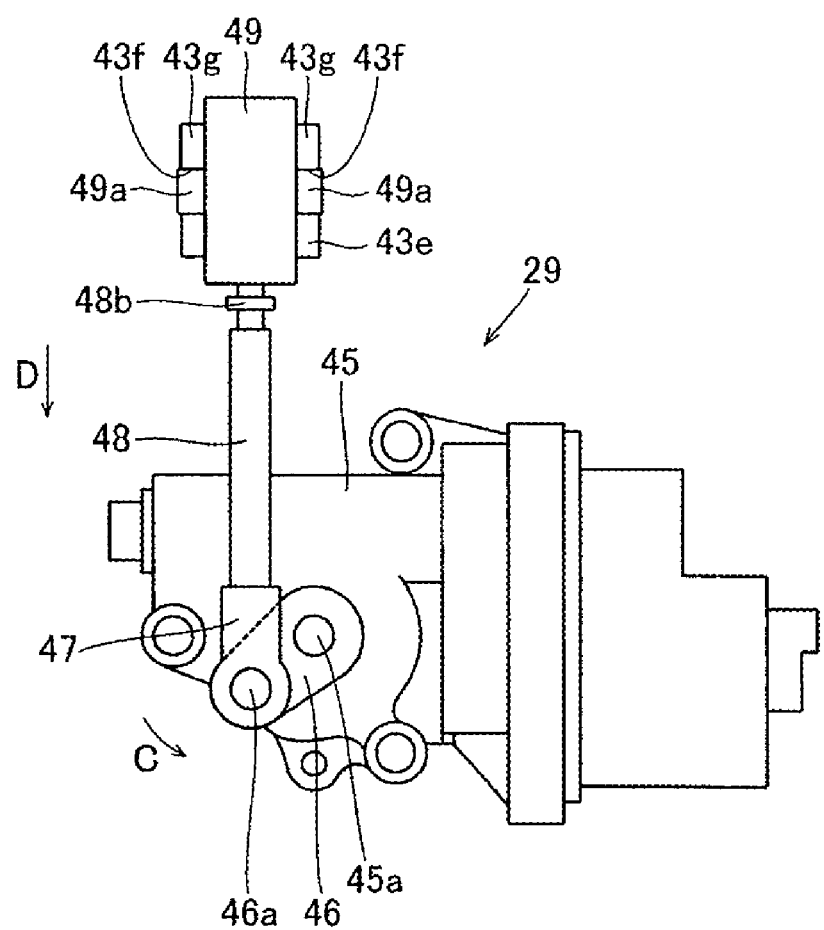

[Fig. 17]
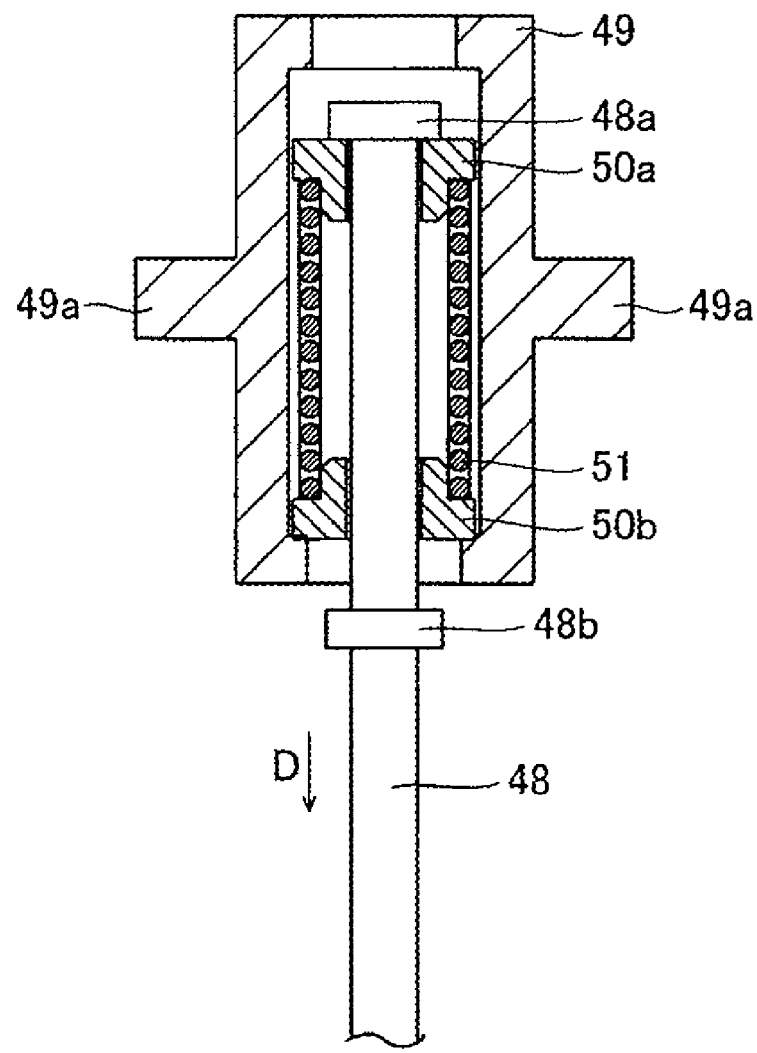

[Fig. 18]
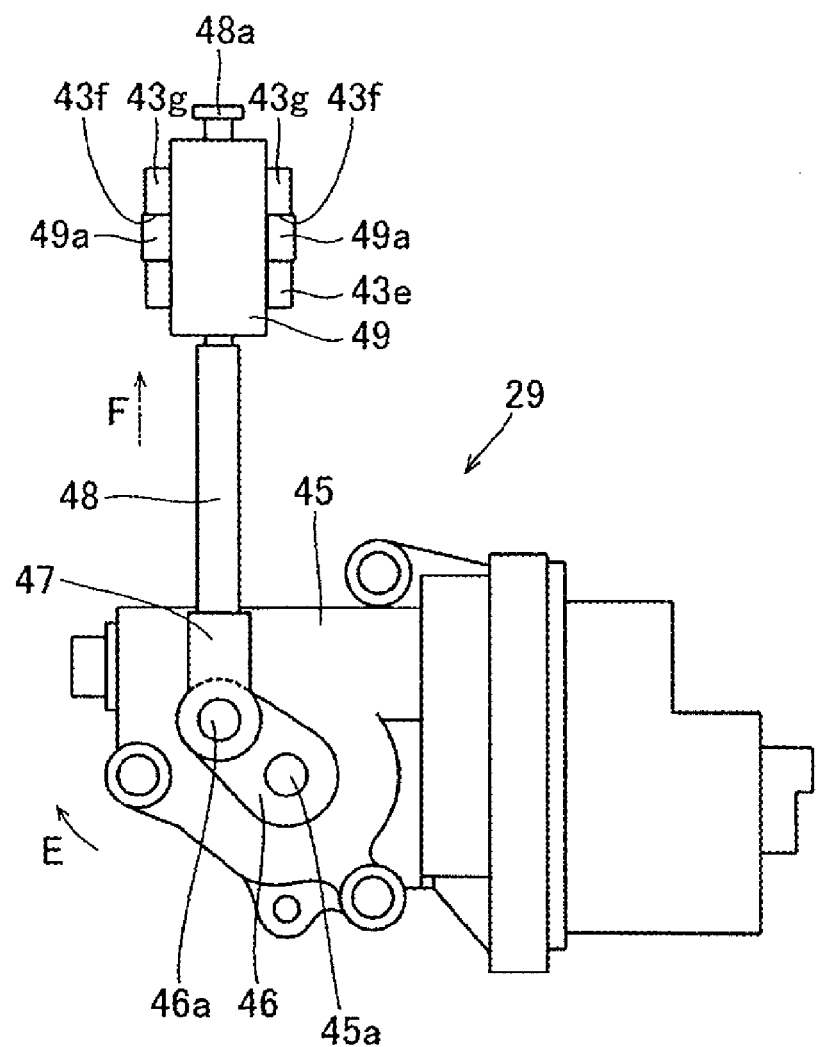

[Fig. 19]
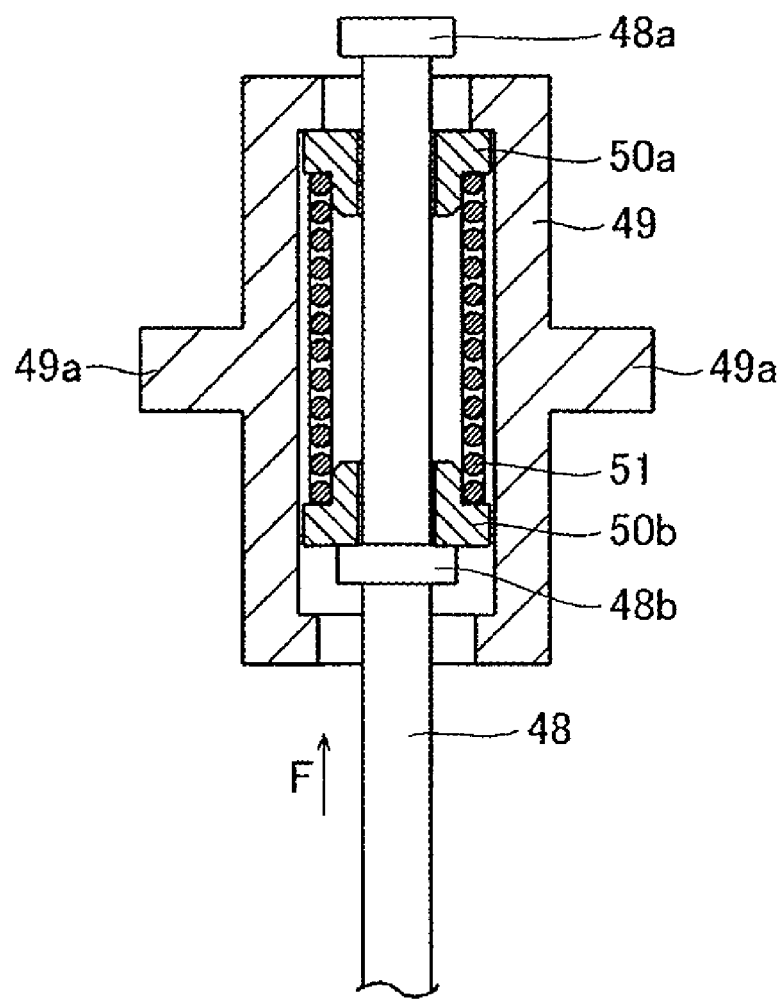

[Fig. 20]
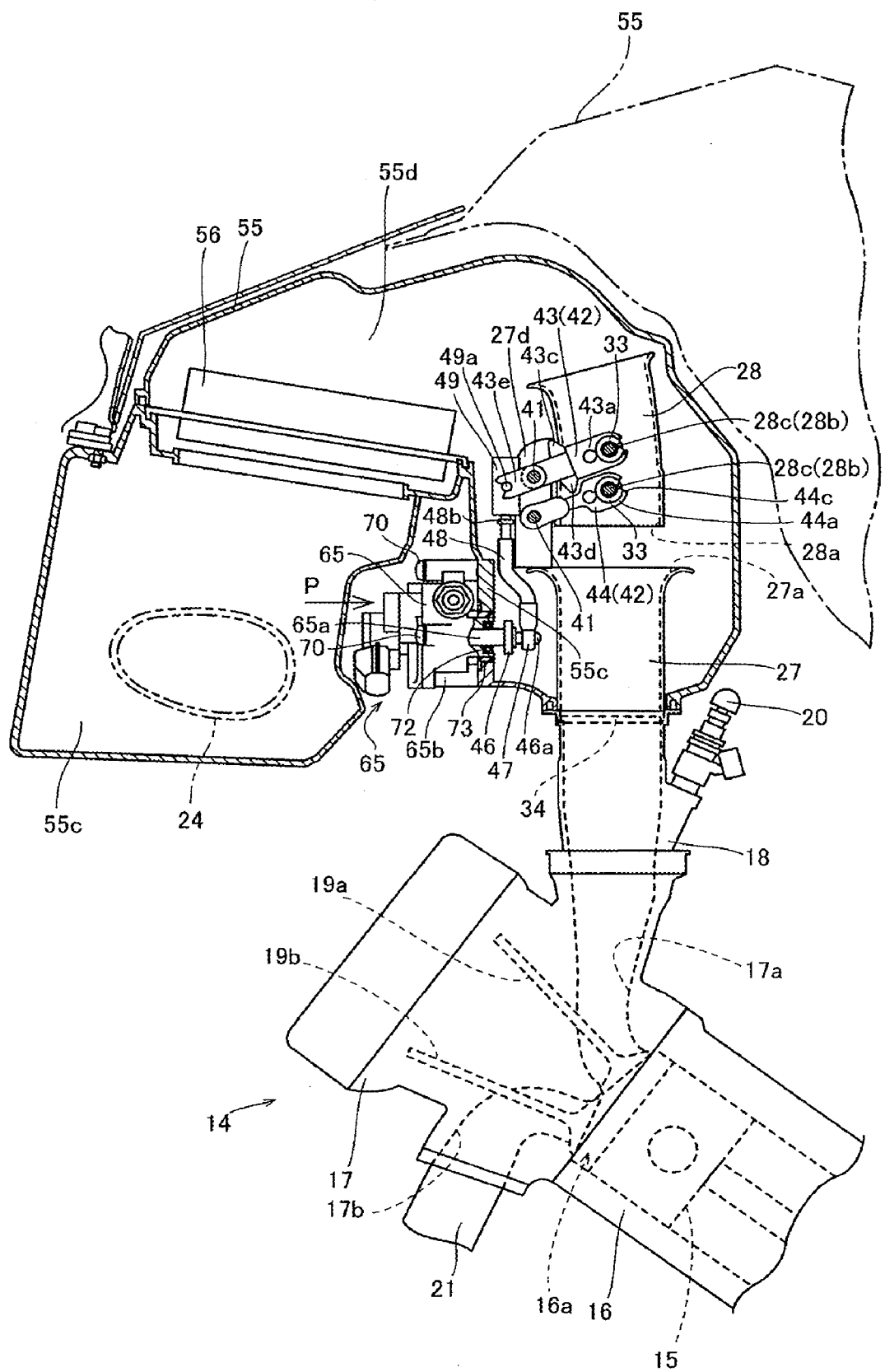

[Fig. 21]
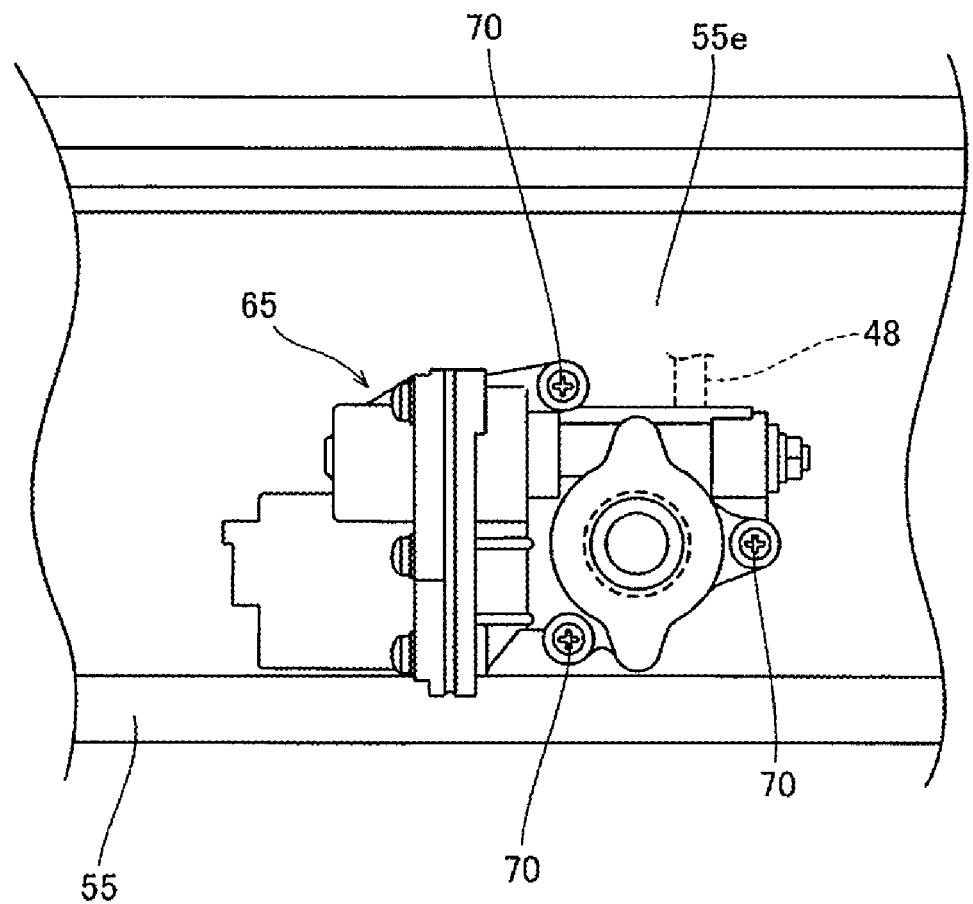

[Fig. 22]
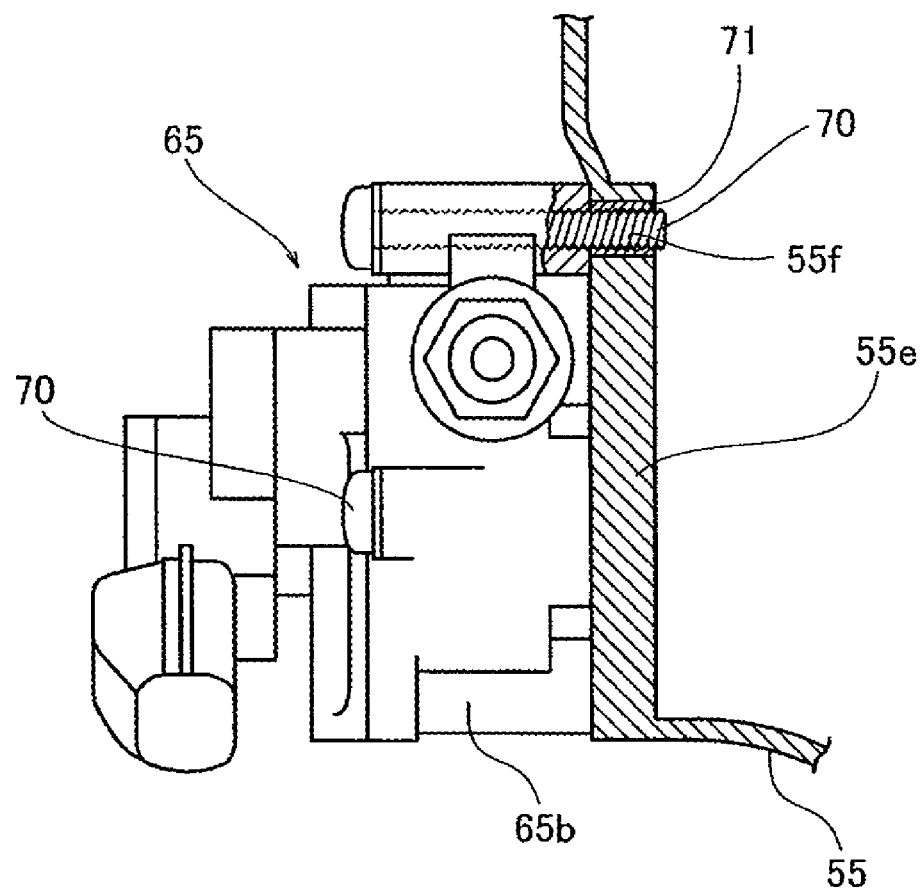

[Fig. 23]
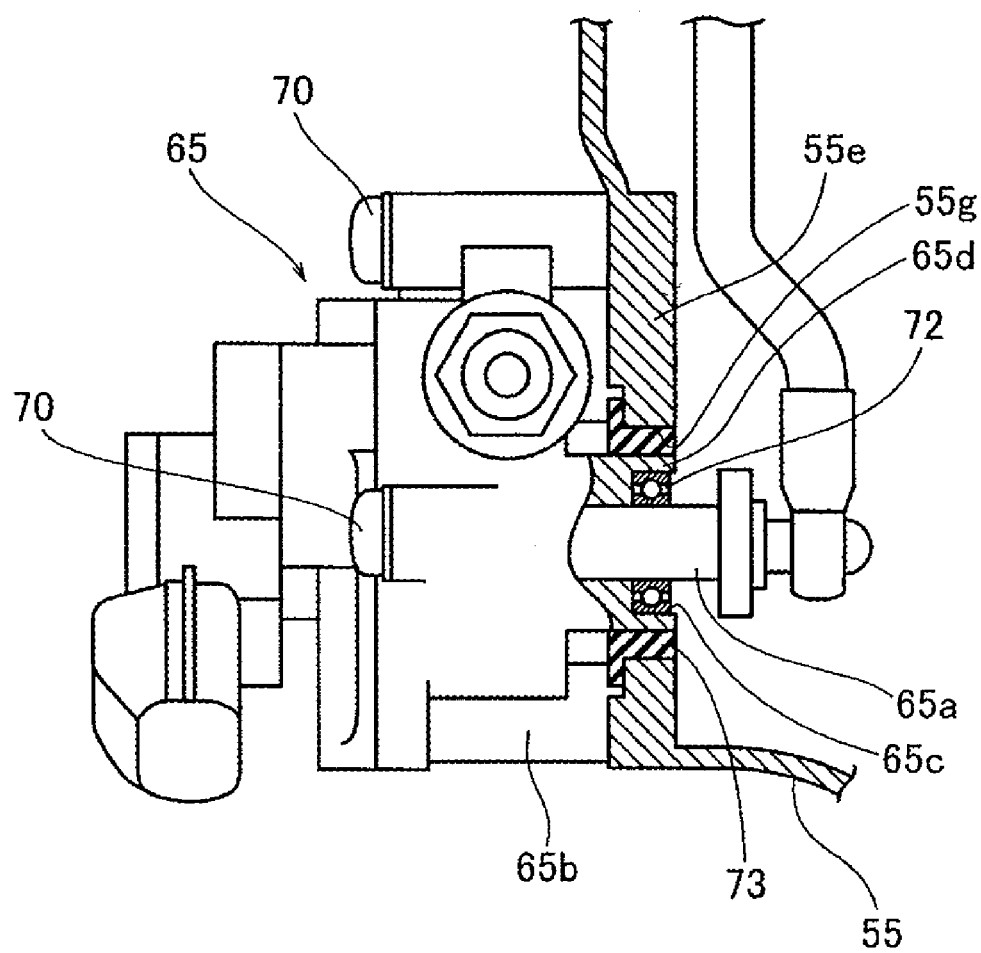

US 7,730,865 B2

ENGINE AIR INTAKE ARRANGEMENT FOR A VEHICLE

CROSS-REFERENCE TO RELATED APPLICATIONS

This application claims priority from Japanese Patent Application Nos. 2006-253641, filed Sep. 20, 2006, and 2006-009139, filed Jan. 17, 2006, the entireties of which are incorporated by reference herein. This application is also related to U.S. application Ser. Nos. 11/623,660 and 11/623,698, filed on even date herewith, and entitled ENGINE AIR INTAKE ARRANGEMENT FOR A VEHICLE, the entireties of which are incorporated by reference herein.

BACKGROUND OF THE INVENTION

1. Field of the Invention

The present invention relates to a vehicle and more particularly to a vehicle equipped with a funnel for introducing air to an intake port of an engine.

2. Description of the Related Art

Intake devices are known that are equipped with a funnel for introducing air to an intake port of an engine. For example, Japanese Patent Publication No. 63-177627 discloses an intake device equipped with a high speed funnel (a fixed funnel) for introducing air to an intake port of an engine. A low speed funnel (a movable funnel) is axially aligned with and spaced from the high speed funnel. A moveable slide valve (or sleeve) is positioned between the high speed funnel and the low speed funnel and that can be moved to selectively couple the low speed funnel with the high speed funnel. A lever arm is attached to the slide valve and a motor is arranged to drive the lever arm via a drive train, including an intermediate gear, a rocking gear, and other components.

The intake device of the Japanese Patent Publication No. 63-177627 is structured such that, when the engine is rotating at low speed, the slide valve couples the high speed funnel and the low speed funnel such that air intake travels through the lengthened passage defined by both funnels in a manner desirable for low speed rotation. In addition, when the engine is rotating at high speed, the slide valve slides away from the high speed funnel to uncouple the low speed funnel from the high speed funnel. As a result, air intake to the engine travels through the shortened passage defined by only the high speed funnel in a manner desirable for high speed rotation. In other words, the intake device defines a variable length air intake passage. Further, the motor and a section of the intermediate gear are positioned in a rearward location outside of a case (such as an air cleaner box) that covers the funnels of the intake device.

SUMMARY OF THE INVENTION

However, an aspect of the present invention involves the discovery that, in the structure disclosed in Japanese Patent Publication No. 63-177627, the motor that moves the slide valve to vary air intake and a section of the intermediate gear are disposed in an area rearward of the intake device. This causes the difficulty that the rearward section of the case is enlarged. As a result, the space for disposing the fuel tank, which normally is disposed to the rear of the intake device, is made smaller. Such an arrangement causes the volume of the fuel tank has to be reduced.

An aspect of the invention is to provide a vehicle that addresses the above-described problems and is arranged to inhibit reduction of the volume of a fuel tank disposed to the rear of a moveable funnel that varies air intake.

An aspect of the present invention involves a vehicle including an engine having an intake port and a fixed funnel that delivers air to the intake port of the engine. A moveable funnel is positioned on the intake side of the fixed funnel and selectively cooperates with the fixed funnel to deliver air to the intake port of the engine along with the fixed funnel. A linkage moveably supports the moveable funnel. A fuel tank is positioned to the rearward side of the moveable funnel when the vehicle is viewed from a side. A drive source drives the linkage to move the moveable funnel. The drive source is positioned on the opposite side of the movable funnel from the fuel tank. With such a structure, space for positioning the drive source that moves the moveable funnel does not need to be provided on the fuel tank side, and this space can be used for accommodating the fuel tank. As a result, the volume of the fuel tank, which is disposed to the rear of the moveable funnel, is inhibited from being reduced.

Another aspect of the present invention involves a vehicle as described above, further including a case in which the fixed funnel and the moveable funnel are positioned. Preferably, the linkage is positioned inside the case and the drive source is positioned outside the case. As a result of adopting this structure, it is no longer necessary to arrange electrical wiring or the like for driving the drive source inside the case, into which vaporized gasoline coming from the direction of the engine may enter. Accordingly, it is possible to inhibit deterioration of the electrical wiring caused by vaporized gasoline that has entered into the case.

Yet another aspect of the present invention involves a vehicle as described above, in which an air filter is provided inside the case and the drive source is positioned between an upstream side section and a downstream side section of the case. The upstream side section and the downstream side section being respectively upstream and downstream from the air filter portion. If this structure is adopted, it is possible to ensure sufficient space for accommodating the drive source.

A further aspect of the present invention involves a vehicle as described above, in which the drive source includes a drive shaft that extends from outside to inside of the case. Wherein, the vehicle further includes a seal member that seals a gap between the drive shaft and the case. With such an arrangement, air inside the case is inhibited from passing into or out of the case through the gap between the drive shaft and the case. As a result, it is possible to inhibit the occurrence of interference of the flow of air that enters the engine in the inside of the case.

Yet another aspect of the present invention involves a vehicle as described above, in which the seal member includes a bearing includes a seal portion. Wherein, the bearing rotatably supports the drive shaft of the drive source. If this structure is adopted, the bearing including the seal portion is able to seal the area between the drive shaft and the case.

A further aspect of the present invention involves a vehicle as described above, in which the seal member includes an elastic member disposed in the gap between the drive shaft of the drive source and the case. If this structure is adopted, it is possible to seal the gap between the drive shaft and the case.

Another aspect of the present invention involves a vehicle as described above, wherein the drive source includes a motor. The motor includes a motor drive shaft that extends from the outside to the inside of the case. Wherein, the vehicle further includes a lever that has a first end connected to the motor drive shaft, and that converts rotational motion of the motor drive shaft to linear motion. If this structure is adopted, the lever can be used to convert the rotational motion of the motor drive shaft to linear motion necessary for causing movement of the moveable funnel.

Still another aspect of the present invention involves a vehicle as described above, further including a connecting rod that connects a second end of the lever to the linkage. If this structure is adopted, the linear motion converted by the lever can be transmitted to the linkage via the lever.

A further aspect of the present invention involves a vehicle as described above, in which the linkage is a parallel link that includes a plurality of linkage members that moveably support the moveable funnel such that it is capable of substantially parallel movement relative to the fixed funnel. If this structure is adopted, the parallel link is used to move the moveable funnel. As a result, the outlet end of the moveable funnel can be separated from, and brought into contact with, the inlet end of the fixed funnel. Moreover, the outlet end of the moveable funnel is held substantially parallel with respect to the inlet end of the fixed funnel. As a result, even if the outlet end of the moveable funnel is separated from the inlet end of the fixed funnel, air that enters through the fixed funnel having passed through the moveable funnel is able to flow linearly. Accordingly, it is possible to inhibit the flow resistance of the air from increasing. As a result, when the moveable funnel is separated from the fixed funnel, a reduction in the intake efficiency can be inhibited.

Another aspect of the present invention involves a vehicle as described above, wherein at least one of the linkage members has a first end that is connected to the lever and a second end that is connected to the moveable funnel. If this structure is adopted, the driving force of the drive source can be easily transmitted to the moveable funnel while the outlet end of the moveable funnel is held parallel with the inlet end of the fixed funnel.

A further aspect of the present invention involves a vehicle as described above, wherein when the engine is rotating at high speed, the linkage members rotate in a first direction to move the outlet end of the moveable funnel to a first position in which the outlet end is spaced from the inlet end of the fixed funnel. Furthermore, when the engine is rotating at low speed, the linkage members rotate in a second direction opposite the first direction to move the outlet end of the moveable funnel to a second position in which the outlet end contacts the inlet end of the fixed funnel. If this structure is adopted, when the rotation speed of the engine changes from low to high, the moveable funnel can be moved from the second position to the first position while the outlet end of the moveable funnel is held parallel with the inlet end of the fixed funnel. As a result, when the engine is rotating at high speed, air that enters through the fixed funnel having passed through the moveable funnel is able to flow linearly. Accordingly, it is possible to inhibit flow resistance of the air from increasing. As a result, when the engine is rotating at high speed, a reduction in the intake efficiency can be inhibited.

Still another aspect of the present invention involves a vehicle as described above, in which an amount of rotation of the lever is adjusted such that the radial position of the outlet end of the moveable funnel, relative to the axis of the inlet end of the fixed funnel, is substantially the same in both the first position and the second position. In other words, the outlet end of the moveable funnel lies along the same axis in both the first and second positions. If this structure is adopted, when the moveable funnel is moved from the second position to the first position (when the engine is rotating at high speed), a volume of air that enters the fixed funnel having passed through the moveable funnel is able to flow in a substantially linear manner. Accordingly, it is possible to inhibit flow resistance of the air from increasing.

BRIEF DESCRIPTION OF THE DRAWINGS

These and other features, aspects and advantages of the present invention are described below with reference to drawings of preferred embodiments, which are intended to illustrate and not to limit the present invention. The drawings contain twenty-three (23) figures.

FIG. 1 is a side view showing the overall structure of a motorcycle according to a first embodiment of the invention.

FIG. 2 is a partial cross sectional view of a periphery section of a fuel tank and an air cleaner box of the motorcycle of the first embodiment shown in FIG. 1.

FIG. 3 is a side view of a periphery area of funnels of the motorcycle of the first embodiment shown in FIG. 1.

FIG. 4 is a side view of the periphery area of the funnels of the motorcycle of the first embodiment shown in FIG. 1.

FIG. 5 is a top view illustrating the air cleaner box and the fuel tank of the motorcycle of the first embodiment shown in FIG. 1.

FIG. 6 is a front view of a periphery area of the funnels of the motorcycle of the first embodiment shown in FIG. 1.

FIG. 7 is a perspective view showing a state when moveable funnels of the motorcycle of the first embodiment shown in FIG. 1 have been moved to a separation position.

FIG. 8 is a side view showing a state when the moveable funnels of the motorcycle of the first embodiment shown in FIG. 1 have been moved to the separation position.

FIG. 9 is a perspective view showing a state when the moveable funnels of the motorcycle of the first embodiment shown in FIG. 1 have been moved to a contacting position FIG. 10 is a side view showing a state when the moveable funnels of the motorcycle of the first embodiment shown in FIG. 1 have been moved to the contacting position.

FIG. 11 is a plan view that illustrates the periphery area of the funnels of the motorcycle of the first embodiment shown in FIG. 1.

FIG. 12 is a perspective view of fixed funnels of the motorcycle of the first embodiment shown in FIG. 1.

FIG. 13 is a front view of the fixed funnels of the motorcycle of the first embodiment shown in FIG. 1.

FIG. 14 is a cross sectional view that illustrates the structure of fastener insertion holes of the fixed funnels shown in FIG. 12 and FIG. 13.

FIG. 15 is a front view of the moveable funnels of the motorcycle of the first embodiment shown in FIG. 1.

FIG. 16 is a front view of a funnel moving mechanism of the motorcycle of the first embodiment shown in FIG. 1.

FIG. 17 is a cross sectional view that illustrates the structure of a moving member of the funnel moving mechanism shown in FIG. 16.

FIG. 18 is a front view of the funnel moving mechanism of the motorcycle of the first embodiment shown in FIG. 1.

FIG. 19 is a cross sectional view that illustrates the structure of the moving member of the funnel moving mechanism shown in FIG. 18.

FIG. 20 is a side view of a periphery area of funnels of a motorcycle according to a second embodiment of the invention.

FIG. 21 is a view along the direction of arrow P of FIG. 20 that illustrates the attachment structure of a motor according to the second embodiment of the invention shown in FIG. 20.

FIG. 22 is a cross sectional view that illustrates the attachment structure of the motor according to the second embodiment of the invention.

FIG. 23 is a cross sectional view that illustrates the attachment structure of the motor according to the second embodiment of the invention.

DETAILED DESCRIPTION OF THE PREFERRED EMBODIMENT

FIG. 1 is a side view of an overall structure of a motorcycle according to a first embodiment of the invention. FIG. 2 to FIG. 19 illustrate in more detail the structure of funnels of the motorcycle according to the first embodiment shown in FIG. 1. The first embodiment is a motorcycle that is one example of a vehicle of the present invention. In the figures, the arrow FWD indicates a forward direction of operation of the motorcycle. Certain arrangements and components are described with reference to the motorcycle in the orientation of FIG. 1 herein. The structure of the motorcycle according to the first embodiment is described with reference to FIG. 1 to FIG. 19.

In the structure of the motorcycle according to the first embodiment of the invention, as shown by FIG. 1 and FIG. 2, a front end section of a main frame 2 is connected to a head pipe 1. The main frame 2, as can be seen from FIG. 3, is disposed such that it splits and extends to the left and right with respect to the forward direction of a vehicle body. In addition, as can be seen from FIG. 1 and FIG. 2, the main frame 2 is formed to extend in a downward and rearward direction. Further, a seat rail 3 that extends in and upward and rearward direction is connected to the main frame 2. In addition, a steering mechanism 4 is rotatably attached to the head pipe 1. A handle 5 is attached to the upper end of the steering mechanism 4, and a clutch lever 6 is attached to the handle 5. Further, a front fork 7 is attached to a lower end of the steering mechanism 4, and a front wheel 8 is rotatably mounted to a lower end of the front fork 7.

In addition, a front end section of a swing arm 10 is attached via a pivot bearing 9 to a rear end section of the main frame 2. A rear wheel 11 is rotatably mounted to a rear end section of the swing arm 10. Further, a fuel tank 12 is disposed generally above the main frame 2 so as to cover a rear side of an air cleaner box 25, described hereinafter. In addition, a seat 13 is disposed on an upper side of the seat rail 3, and an engine 14 is mounted generally below the main frame 2.

The engine 14, as shown in FIG. 4, includes a piston 15, a cylinder 16, a cylinder head 17, and a throttle body 18. The piston 15 is fitted inside the cylinder 16 and the cylinder head 17 is disposed so as to block an open end of the cylinder 16. Further, an intake port 17a and an exhaust port 17b are formed in the cylinder head 17. The intake port 17a is provided to supply an air-fuel mixture including air and fuel to a combustion chamber 16a of the cylinder 16. Further, the exhaust port 17b is provided to exhaust residual gas remaining after combustion from the combustion chamber 16a of the cylinder 16. Moreover, an intake valve 19a and an exhaust valve 19b are respectively provided in the intake port 17a and the exhaust port 17b. The throttle body 18 is attached to an opening of the intake port 17a. Further, an injector 20 is attached to the throttle body 18 in order to inject fuel to the intake port 17a. In addition, an exhaust pipe 21 is attached to an opening of the exhaust port 17b. This exhaust pipe 21 is connected to a muffler 22 (refer to FIG. 1 and FIG. 2). Note that, although only one cylinder 16 is shown in FIG. 4; however, preferably multiple cylinders and, more preferably, four cylinders 16 are disposed at predetermined distances apart in the width direction of the vehicle. In other words, the engine 14 of the first embodiment of the invention preferably is a 4-cylinder engine.

Further, as can be seen in FIG. 1 and FIG. 2, a front cowl 23 that includes an upper cowl 23a and a lower cowl 23b is provided so as to cover a front side of the vehicle body. Intake holes 23c are provided in a front side of the lower cowl 23b. Note that, FIG. 1 and FIG. 2 only show, with respect to the forward direction of the vehicle body, the left side intake hole 23c. However, preferably a pair of the intake holes 23c is provided in a left-right symmetrical manner with respect to the forward direction of the vehicle body. Further, air ducts 24 are connected to the intake holes 23c of the lower cowl 23b. In addition, as shown in FIG. 1 to FIG. 3, the air cleaner box 25, which is supplied with air from the air ducts 24, is disposed between the left and right branches of the main frame 2.

More specifically, as shown in FIG. 4, a cover 25a, preferably made of resin, is positioned so as to cover an upper surface of a front section of the air cleaner box 25. In addition, a rear section and a rear section upper surface of the air cleaner box 25 are covered by the fuel tank 12. In addition, as shown in FIG. 4 and FIG. 5, a protrusion 25b is provided at the rear section of the air cleaner box 25 and protrudes outwardly from the air cleaner box 25. The protrusion 25b, as can be seen in FIG. 4, is provided so as to protrude outwardly at a region that corresponds to a rear, upper edge portion of a moveable funnel 28, described hereinafter, such that the rear, upper edge portion of the moveable funnel 28 does not come into contact with an inner surface of the air cleaner box 25. As a result, as compared to an arrangement in which the entire rear section of the air cleaner box 25 is enlarged to accommodate the movable funnel 28, it is possible to inhibit the volume of the fuel tank 12 from having to be reduced. Further, as can be seen in FIG. 3 and FIG. 4, an air filter 26 for filtering the air supplied from the air ducts 24 is provided inside the air cleaner box 25. The air cleaner box 25 is just one example of a "case" for the funnels 27 and 28, and the illustrated air filter 26 is just one example of an "air filter" of the invention.

Moreover, as shown in FIG. 3, FIG. 4 and FIG. 6, fixed funnels 27, moveable funnels 28, and a funnel moving mechanism 29 are provided inside the air cleaner box 25. Desirably, one each of the fixed funnel 27 and the moveable funnel 28 are provided for each cylinder 16 of the engine 14. Further, the fixed funnels 27 are fixed with respect to the air cleaner box 25 and function to introduce purified air inside the air cleaner box 25 to the intake ports 17a. In addition, the moveable funnels 28 are disposed on the inlet side (the upstream side) of the fixed funnels 27, and selectively cooperate with the fixed funnels 27 to introduce purified air inside the air cleaner box 25 to the intake ports 17a.

In addition, as shown in FIG. 7 to FIG. 10, each moveable funnel 28 is structured so as to be moveable between a separation position and a contacting position relative to the fixed funnel 27. The separation position (the state shown in FIG. 7 and FIG. 8) is a position at which an outlet or outlet end 28a of the moveable funnel 28 is separated from an inlet or inlet end 27a of the fixed funnel 27. The contacting position (the state shown in FIG. 9 and FIG. 10) is a position at which the outlet end 28a of the moveable funnel 28 is placed in contact with the inlet end 28a of the fixed funnel 27. When the moveable funnel 28 is moved to the separation position (the state shown in FIG. 7 and FIG. 8), the intake passage that connects the air cleaner box 25 and the cylinder 16 is defined by the fixed funnel 27, the throttle body 18, and the intake port 17a. On the other hand, when the moveable funnel 28 is moved to the contacting position (the state shown in FIG. 9 and FIG. 10), the intake passage that connects the air cleaner box 25 and the cylinder 16 is defined by the moveable funnel 28, the fixed funnel 27, the throttle body 18 and the intake port 17a. Further, the funnel moving mechanism 29 functions to move the moveable funnels 28 between the separation position and the contacting position. Note that, the separation position and the contacting position are just examples of a "first position" and a "second position."

In addition, as can be seen from FIG. 11 to FIG. 13, in the illustrated arrangement, the fixed funnels 27 are structured such that neighboring pairs of the fixed funnels 27 are integrally formed via a connecting section 27b. More specifically, the first embodiment of the invention includes two of a component 30 in which neighboring pairs of fixed funnels 27 are integrated. Further, three fastener insertion holes 27c are respectively formed in each component 30 that integrates the pair of fixed funnels 27. Fasteners, such as screws 31 (refer to FIG. 14) are inserted in the fastener insertion holes (hereinafter referred to as screw insertion holes 27c). In addition, as shown in FIG. 14, each fixed funnel 27 (the component 30) is attached to both the air cleaner box 25 and the throttle body 18 by screwing the screws 31 into the screw insertion holes 27c. Note that, screw insertion holes 25a into which the screws 31 are inserted are provided in the air cleaner box 25.

Further, as shown in FIG. 11 to FIG. 13, a strut 27d is integrally provided with the component 30 that integrates the pair of fixed funnels 27. A pair of turning shaft support holes 27e that rotatably support an end section of turning shafts 41, described hereinafter, is formed by the strut 27d.

In addition, in the first embodiment, as shown in FIG. 11 to FIG. 15, the moveable funnels 28 have a structure in which neighboring pairs of moveable funnels 28 are formed integrally via a pair of support shafts 28b. In other words, the first embodiment includes a pair of components 32 in which neighboring pairs of moveable funnels 28 are integrated. Further, the support shafts 28b are positioned between the pair of moveable funnels 28 of each component 32. As a result of the support shaft 28b being supported by parallel linkage 42, described hereinafter, the moveable funnels 28 (the component 32) are held in a moveable manner. Further, reduced diameter sections 28c are formed in the support shafts 28b.

In addition, support shafts 28e having reduced diameter sections 28d are provided at the outer side surface of the component 32 that integrates the neighboring pairs of moveable funnels 28. Further, a strengthening rib 28f is provided between the pair of moveable funnels 28 of the component 32. Moreover, as shown in FIG. 11, two of the components 32 that integrates the pair of moveable funnels 28 are positioned such that the end surfaces of the respective reduced diameter sections 28d of the support shafts 28e face each other.

Further, in the first embodiment, referring to FIG. 11, a split bushing 33 is mounted on each reduced diameter section 28c of the support shaft 28b of the moveable funnels 28 (the component 32). This split bushing 33 functions to allow rotation of the parallel link 42 with respect to the support shaft 28b, which is described hereinafter. In addition, the split bushing 33 is also mounted on the reduced diameter sections 28d of the support shafts 28e positioned between the components 32 that integrate the pairs of moveable funnels 28. Preferably, only one of the split bushings 33 is positioned between the components 32 that integrate the pairs of moveable funnels 28. This split bushing 33 is mounted so as to straddle between the reduced diameter sections 28d of the pair of support shafts 28e.

Further, referring to FIG. 6 through FIG. 8, an annular resilient member, or rubber lip 34 is mounted on the outlet end 28a portion of each moveable funnel 28. This rubber lip 34 functions to seal the gap between the moveable funnel 28 and the fixed funnel 27 when the moveable funnel 28 is moved to the contacting position (the state shown in FIG. 10).

Moreover, in the first embodiment, as shown in FIG. 8 to FIG. 10, the funnel moving mechanism 29 uses the parallel linkage 42 to move the moveable funnel 28 between the separation position (the state shown in FIG. 7 and FIG. 8) and the contacting position (the state shown in FIG. 9 and FIG. 10).

As shown in FIG. 11 through FIG. 13, the funnel moving mechanism 29 is arranged such that the end sections of the turning shafts 41 are rotatably supported in the turning shaft support holes 27e of the strut 27d provided on the fixed funnel 27 (the component 30). Further, stepped sections 41a are provided in a first end section and a second end section of each turning shaft 41, and these stepped sections 41a abut with respective surfaces of the strut 27d that define the turning shaft support holes 27e. As a result, movement in the axial direction of the turning shafts 41 is controlled.

Further, in the first embodiment, as shown in FIG. 11, the parallel linkage 42 is attached respectively to a first end portion and a second end portion of the turning shafts 41 so as to rotate along with the turning shafts 41. Note that, the parallel linkage 42 is just one example of a "linkage" of the present vehicle intake system. The parallel linkage 42, as can be seen from FIG. 7 to FIG. 10, includes an upper side linkage member 43 attached to the turning shaft 41 at the upper side, and a lower side linkage member 44 attached to the turning shaft 41 at the lower side. Note that, the upper side linkage member 43 and the lower side linkage member 44 are just examples of a "linkage member."

The upper linkage member 43, as shown in FIG. 8, has a fitting portion 43a, a turning shaft insertion hole 43b, and a pair of stops 43c and 43d. As in FIG. 7 through FIG. 10, the upper support shaft 28b (the reduced diameter section 28c) of the moveable funnel 28 is fitted via the split bushing 33 in the fitting portion 43a of the upper linkage member 43. As a result, the upper linkage member 43 is rotatable with respect to the upper support shaft 28b. Further, as shown in FIG. 7 to FIG. 10, the upper turning shaft 41 is fixed to the turning shaft insertion hole 43b of the upper linkage member 43 such that the upper linkage member 43 rotates along with the upper turning shaft 41. In addition, as shown in FIG. 8, the stop 43c of the upper linkage member 43 functions to control rotation of the upper linkage member 43 in direction A by abutting with the strut 27d of the fixed funnel 27 when the upper linkage member 43 has turned a particular amount in direction A. Further, as shown in FIG. 10, the stop 43d of the upper linkage member 43 functions to control rotation in direction B of the upper linkage member 43 by abutting with the strut 27d of the fixed funnel 27 when the upper linkage member 43 has rotated a particular amount in direction B. Note that, the arrow showing direction A is just one example of a "first direction" and the arrow showing direction B is just one example of a "second direction."

In addition, referring to FIG. 10 and FIG. 11, a support portion 43e that is supported by a moving member 49, described hereinafter, of the upper linkage member 43 supports the moveable funnels 28 (the component 32). The support portion 43e is structured by a pair of retaining tabs 43g in which respective notches 43f are formed, and is opposite of the fitting portion 43a. Note that, the support portion 43e, described above, is not provided in the lower linkage member 44 that provides the other support for the moveable funnels 28 (the component 32).

In addition, the lower linkage member 44, as can be seen from FIG. 8 to FIG. 10, has a fitting portion 44a and a turning shaft insertion hole 44b. The lower support shaft 28b (the reduced diameter section 28c) of the moveable funnel 28 is fitted to the fitting portion 44a of the lower linkage member 44 via the split bushing 33. As a result, the lower linkage member 44 is rotatable with respect to the lower support shaft 28b. Further, the lower turning shaft 41 is fixed in the turning shaft insertion hole 44b of the lower linkage member 44 such that the lower linkage member 44 turns along with the lower turning shaft 41. Note that, as shown in FIG. 11, a linkage member 44d having a fitting portion 44a, and a turning shaft insertion hole 44b like the lower linkage member 44, and a split section 44c is positioned between the components 32 that integrate the pairs of moveable funnels 28.

As a result of the structure described above, when the parallel linkage 42 rotates in direction A, each moveable funnel 28 moves away from the fixed funnel 27, as shown in FIG. 8. Further, as shown in FIG. 10, when the parallel linkage 42 rotates in direction B, each moveable funnel 28 moves toward the fixed funnel 27. As shown in FIG. 8 and FIG. 10, the amount of rotation of the parallel linkage 42 is adjusted such that the radial position of an outlet end surface 28g (refer to FIG. 7, FIG. 8 and FIG. 10) of the moveable funnel 28 in the separation position (the state of FIG. 8), and the radial position of the outlet end surface 28g (refer to FIG. 7, FIG. 8 and FIG. 10) of the moveable funnel 28 in the contacting position (the state of FIG. 10) are substantially the same relative to the axis 300 defined by the inlet end 27a of the fixed funnel 27 (or appear to be in the same position when viewed along the axis 300). More specifically, as shown in FIG. 8 and FIG. 10, adjustment is performed such that a central axis 200 of the outlet end surface 28g of the moveable funnel 28 in the separation position (the state shown in FIG. 8) and a central axis 300 of the outlet end surface 28g of the moveable funnel 28 in the contacting position (the state shown in FIG. 10) are substantially aligned. In addition, the amount of rotation of the parallel linkage 42 is adjusted such that the position of the upper support shaft 28b in the separation position (the state shown in FIG. 8) when viewed along the axis 300 of the fixed funnel 27, and the position of the upper support shaft 28b in the contacting position (the state shown in FIG. 10) when viewed along the axis 300 of the fixed funnel 27 are substantially the same. Further, the amount of rotation of the parallel linkage 42 is adjusted such that the position of the lower support shaft 28b in the separation position (the state shown in FIG. 8) when viewed along the axis 300 of the fixed funnel 27, and the position of the lower support shaft 28b in the contacting position (the state shown in FIG. 10) when viewed along the axis 300 of the fixed funnel 27 are substantially the same. In addition, the amount of rotation of the parallel linkage 42 is adjusted such that the position of the upper support shaft 28b in the separation position (the state shown in FIG. 8) when viewed along the axis 300 of the fixed funnel 27, and the position of the lower support shaft 28b in the separation position (the state shown in FIG. 8) when viewed along the axis 300 of the fixed funnel 27 are substantially the same. Further, the amount of rotation of the parallel linkage 42 is adjusted such that the that the position of the upper support shaft 28b in the contacting position (the state shown in FIG. 10) when viewed along the axis 300 of the fixed funnel 27, and the position of the lower support shaft 28b in the contacting position (the state shown in FIG. 10) when viewed along the axis 300 of the fixed funnel 27 are substantially the same.

Moreover, as shown in FIG. 8, the stop 43c of the parallel link 42 (the upper linkage member 43) is adjusted so as to abut with the strut 27d when the moveable funnel 28 reaches the separation position. Further, as shown in FIG. 10, the stop 43d of the parallel linkage 42 (the upper linkage member 43) is adjusted so as to abut with the strut 27d when the moveable funnel 28 reaches the contacting position.

In addition, in the first embodiment, as shown in FIG. 8 and FIG. 11, each of the upper linkage member 43 and the lower linkage member 44 of the parallel linkage 42 is caused to rotate by the driving force of a motor 45. More specifically, an output shaft 45a of the motor 45 is attached to one end section of a turning lever, or lever 46. Note that, the motor 45 is just one example of a "drive source," and the output shaft 45a is just one example of a "drive shaft" and a "motor drive shaft." Further, as shown in FIG. 4, the motor 45 is located at a position that is between an upstream side section 25c that is generally upstream of the flow of air from the air filter 26 disposed inside the air cleaner box 25, and a downstream side section 25d that is generally downstream of the flow of air from the air filter 26. Further, the motor 45 is provided at a location outside the air cleaner box 25. More specifically, the air cleaner box 25 is provided with a U-shape, and provided with the upstream side section 25c upstream of the air filter 26 and the downstream side section 25d downstream of the air filter 26, which face one another. Further, the motor 45 is positioned in a space defined between the upstream side section 25c to the upstream of the air filter 26 and the downstream side section 25d to the downstream of the air filter 26 that face each other.

Moreover, as shown in FIG. 8 and FIG. 11, a generally spherical support member 46a is provided a second end of the turning lever 46. A connecting member 47 is attached to the spherical support member 46a of the turning lever 46 such that the connecting member 47 is capable of rocking with respect to the support member 46a. Further, a moving shaft, or connecting rod 48, is attached to the connecting member 47. As can be seen in FIG. 17, an upper pressing member 48a and a lower pressing member 48b are provided on the moving shaft 48. Note that, the moving shaft 48 is just one example of a "connecting rod." The upper pressing member 48a is positioned at the end section of the moving shaft 48 at the opposite end from the connecting member 47 (FIG. 16). Further, the lower pressing member 48b is positioned in a region that is a predetermined distance of separation in the downward direction from the upper pressing member 48a of the moving shaft 48.

In addition, a moving member 49 is positioned on the end portion of the moving shaft 48 on which the upper pressing member 48a and the lower pressing member 48b are provided. Both side surfaces of this moving member 49, as can be seen in FIG. 16, are provided with protrusions 49a that engage with the pair of notches 43f formed in the upper linkage member 43. Further, the retaining tabs 43g of the upper linkage member 43 are positioned so as to sandwich the moving member 49 therebetween, and the notches 43f are engaged with the protrusions 49a. As a result, the upper linkage member 43 (the support section 43e) is supported by the moving member 49. Moreover, as shown in FIG. 17, bushings 50a and 50b for slidably supporting the moving shaft 48 are provided inside the moving member 49. The bushings 50a and 50b are disposed between the upper pressing member 48a and the lower pressing member 48b. Further, a compression spring 51 is attached between the bushing 50a and the bushing 50b inside the moving member 49.

Further, when the turning lever 46 is rotated in direction C by the driving force of the motor 45 (the state shown in FIG. 16), as shown in FIG. 17, the compression spring 51 generates a biasing force in direction D as a result of movement of the moving shaft 48 in direction D. As a result, the moving member 49 is biased in direction D by the compression spring 51. Accordingly, as can be seen in FIG. 8, the biasing force of the compression spring 51 (refer to FIG. 17), is transmitted to the parallel linkage 42 via the moving member 49, whereby the parallel linkage 42 is rotated in direction A. Further, when the stop 43c of the parallel linkage 42 abuts with the strut 27d as well, the biasing force of the compression spring 51 (FIG. 17) is transmitted via the moving member 49 to the parallel linkage 42 such that the parallel linkage 42 rotates in direction A.

On the other hand, when the turning lever 46 is rotated in direction E by the driving force of the motor 45 (the state shown in FIG. 18), the compression spring 51 generates a biasing force in direction F as a result of movement of the moving shaft 48 in direction F, as shown in FIG. 19. As a result, the moving member 49 is biased in direction F by the compression spring 51. Accordingly, as can be seen in FIG. 10, the biasing force of the compression spring 51 (refer to FIG. 19), is transmitted to the parallel linkage 42 via the moving member 49, whereby the parallel linkage 42 is rotated in direction B. Further, when the stop 43d of the parallel linkage 42 abuts the strut 27d as well, the biasing force of the compression spring 51 (refer to FIG. 19) is transmitted via the moving member 49 to the parallel linkage 42 such that the parallel linkage 42 rotates in direction B.

Next, an operation that is performed when the length of the intake passage that connects the air cleaner box 25 and the cylinder 16 is varied is described with reference to FIG. 4, FIG. 8, FIG. 10, and FIG. 16 to FIG. 19. When the engine 14 shown in FIG. 4 is rotating at high speed, the length of the intake passage is reduced to more easily obtain a pulsation effect. In other words, when the engine 14 is rotating at high speed, the moveable funnel 28 is moved to the separation position.

More particularly, first, as shown in FIG. 16, the turning lever 46 is turned in direction C by the motor 45 of the funnel moving mechanism 29. Accordingly, the moving shaft 48 is moved in direction D. As a result, as shown in FIG. 7, the compression spring 51 (refer to FIG. 17) generates a biasing force in direction D, whereby the moving member 49 is moved in direction D. Thus, the parallel link 42 is turned in direction A. Following this, the parallel link 42 continues turning in direction A until the stop 43c of the upper linkage member 43 abuts with the strut 27d.

As a result, the moveable funnel 28 is moved to the separation position at which the outlet end surface of the outlet end 28a of the moveable funnel 28 is held parallel with respect to the inlet end surface of the inlet end 28a of the fixed funnel 27. Accordingly, when the engine 14 (FIG. 4) is rotating at high speed, the fixed funnel 27, the throttle body 18 (FIG. 4), and the intake port 17a (FIG. 4) define the intake passage. As a result the intake passage is reduced in length. Note that, when the engine 14 shown in FIG. 4 is rotating at high speed and the intake passage is shortened, high pressure-pressure waves can more easily reach the opening at the cylinder 16 side of the intake port 17a when the intake valve 19a is open, whereby intake efficiency is improved.

Note that, as shown in FIG. 8, when the moveable funnel 28 reaches the separation position, the position of the outlet end surface of the outlet end 28a of the moveable funnel 28, when viewed along the axis 300, is the same as the position of the outlet end surface of the outlet end 28a of the moveable funnel 28 in the contacting position (the state of FIG. 10). Further, when the moveable funnel 28 reaches the separation position, the biasing force of the compression spring 51 (refer to FIG. 17) is transmitted to the parallel linkage 42 via the moving member 49 such that the parallel linkage 42 is turned in direction A.

In order to make it easier to obtain a pulsation effect when the engine 14 shown in FIG. 4 is rotating at low speed, the intake passage is lengthened. In other words, when the engine 14 is rotating at low speed, the moveable funnel 28 is moved to the contacting position.

More specifically, as shown in FIG. 18, the turning lever 46 is rotated in direction E by the motor 45 of the funnel moving mechanism 29. Accordingly, the moving shaft 48 is moved in direction F. As a result, as shown in FIG. 10, the compression spring 51 (refer to FIG. 19) generates a biasing force in direction F, whereby the moving member 49 is moved in direction F. Thus, the parallel linkage 42 is turned in direction B. Following this, the parallel linkage 42 continues turning in direction B until the stop 43d of the upper linkage member 43 abuts with the strut 27d.

As a result, the moveable funnel 28 is moved to the contacting position at which the outlet end surface of the outlet end 28a of the moveable funnel 28 is held parallel with respect to the inlet end surface of the inlet end 28a of the fixed funnel 27. Accordingly, when the engine 14 (refer to FIG. 4) is rotating at low speed, the moveable funnel 28, the fixed funnel 27, the throttle body 18 (refer to FIG. 4), and the intake port 17a (refer to FIG. 4) define the intake passage. As a result the intake passage is lengthened. Note that, when the engine 14 shown in FIG. 4 is rotating at low speed and the intake passage is lengthened, high pressure waves can more easily reach the opening at the cylinder 16 side of the intake port 17a when the intake valve 19a is open, whereby intake efficiency is improved.

As shown in FIG. 10, when the moveable funnel 28 reaches the contacting position, the biasing force of the compression spring 51 (FIG. 19) is transmitted to the parallel linkage 42 via the moving member 49 such that the parallel linkage 42 is turned in direction B.

In the first embodiment, the motor 45 that provides drive via the drive shaft 45a in order to move the moveable funnel 28 is disposed, with respect to the moveable funnel 28, at the opposite side of the fuel tank 12 that is disposed to the rear direction side in the running direction of the motorcycle (the direction of the FWD arrow) from the moveable funnel 28. As a result, space for accommodating the motor 45 etc. that moves the moveable funnel 28 does not need to be provided at the fuel tank 12 side, and this space can be used for accommodating the fuel tank 12. As a result, the volume of the fuel tank 12, which is positioned to the rear of the moveable funnel 28 used to vary air intake, is not required to be reduced.

Moreover, in the first embodiment, the parallel linkage 42, the upper linkage member 43, the lower linkage member 44 and the like are provided inside the air cleaner box 25, and the motor 45 is provided outside the air cleaner box 25. As a result, it is no longer necessary to arrange electrical wiring or the like for driving the motor 45 inside the air cleaner box 25, which vaporized gasoline coming from the direction of the engine 14 may enter. Accordingly, it is possible to inhibit deterioration of the electrical wiring caused by vaporized gasoline that has entered into the air cleaner box 25.

Furthermore, in the first embodiment, the motor 45 is positioned between the upstream side portion 25c that is the upstream from the air filter 26 disposed inside the air cleaner box 25 and the downstream side portion 25d that is the downstream from the air filter 26. Further, the motor 45 is provided outside the air cleaner box 25. As a result, it is easily possible to ensure space for accommodating the motor 45.

Further, the first embodiment is structured such that one end of the turning lever 46 is connected to the output shaft 45a in order to convert rotational motion of the output shaft 45a to linear motion. Accordingly, the turning lever 46 is able to convert the rotational motion of the output shaft 45a to the linear motion required by the moveable funnels 28.

Moreover, the first embodiment is also provided with the moving shaft 48 that connects the other end of the turning lever 46 and the upper linkage member 43 via the moving member 49. As a result, the linear motion converted by the turning lever 46 can easily be transmitted to the upper linkage member 43 via the moving shaft 48.

Moreover, as described above, each linkage member 43, 44 of the parallel linkage 42 is used to move the moveable funnel 28. Accordingly, the outlet end 28a of the moveable funnel 28 can be separated away from and brought into contact with respect to the inlet end 28a of the fixed funnel 27, while the outlet end 28a of the moveable funnel 28 is held parallel with respect to the inlet end 27a of the fixed funnel 27. As a result, even if the outlet end 28a of the moveable funnel 28 is separated away from the inlet end 28a of the fixed funnel 27, air that enters the fixed funnel 27 after having passed through the moveable funnel 28 is able to flow linearly. Accordingly, it is possible to inhibit flow resistance of the air from increasing. As a result, when the moveable funnel 28 is separated away from the fixed funnel 27, reduction of intake efficiency can be inhibited from occurring.

Further, in the first embodiment, the amount of rotation of each linkage member 43, 44 of the parallel linkage 42 is adjusted such the position of the outlet end surface 28g of the moveable funnel 28 in the separation position, and the position of the outlet end surface 28g of the moveable funnel 28 in the contacting position are the same when viewed along the axis 300 defined by the inlet 27a of the fixed funnel 27. As a result, when the moveable funnel 28 is moved from the contacting position to the separation position (in the case that the engine 14 is rotating at high speed), the air that enters the fixed funnel 27 having passed through the moveable funnel 28 is able to flow in a substantially linear manner. Accordingly, it is possible to inhibit flow resistance of the air from increasing.

FIG. 20 to FIG. 23 illustrate the structure of the periphery area of the funnels of the motorcycle according to a second embodiment of the invention. FIG. 20 to FIG. 23 are referred to in the description of the second embodiment in which, unlike the above-descirbed first embodiment, a motor 65 that is disposed outside of an air cleaner box 55 is attached to the air cleaner box 55 in a sealed manner. Note that, the other structural features and the operation of the second embodiment may be assumed to be the same as the structural features and the operation of the first embodiment, unless otherwise discussed below.

In the second embodiment, as shown in FIG. 20, the motor 65 is located at a position that is between an upstream side section 55c that is upstream of the flow of air relative to an air filter 56 disposed inside the air cleaner box 55 made of resin, and a downstream side section 55d that is downstream from the air filter 56. Further, the motor 65 is provided outside the air cleaner box 55. More specifically, the air cleaner box 55 is provided with a U-shape, and provided with the upstream side section 55c to the upstream side of the air filter 56 and the downstream side section 55d to the downstream side of the air filter 56, which face each other. Further, the motor 65 is positioned between the upstream side section 25c and the downstream side section 25d. Note that, the motor 65 is just one example of a "drive source." Further, the motor 65, as can be seen in FIG. 20 and FIG. 21, is attached by insertion of three fasteners, such as screws 70 into fastener (screw) holes 55f provided in a wall 55e of the air cleaner box 55. The screw holes 55f, as shown in FIG. 22, are respectively formed in areas that corrrespond with the attachment positions of the screws 70 by embedding metal-made screw hole components 71 in the wall 55e of the resin-made cleaner box 55. Note that, the air cleaner box 55 is just one example of a "case," and the air filter 56 is just one example of an "air filter portion."

In addition, in the second embodiment, the motor 65 includes an output shaft 65a and a motor body 65b. As shown in FIG. 23, a bearing accommodating section 65c that has a recess-like shape is provided integrally with the motor body 65b around the output shaft 65a in the motor body 65b. Further, a seal bearing 72 that functions as a seal is pressed fit into the bearing accommodating section 65c, and the output shaft 65a is inserted inside the seal bearing 72. As a result, it is possible to inhibit exit and entry of air to the air cleaner box 55 from the area around the output shaft 65a of the motor 65. Note that, the seal bearing 72 is just one example of a "bearing having a seal function." In addition, a ring-shaped protrusion 65d is provided integrally with the motor body 65b in an attachment section of the motor 65 for attachment to the air cleaner box 55. A grommet 73 made of rubber is mounted around the outer periphery surface of the protrusion 65d. Note that, the grommet 73 is just one example of an "elastic member." Further, the protrusion 65d to which the grommet 73 is mounted is fitted in a hole 55g provided in the wall 55e of the air cleaner box 55. More specifically, the protrusion 65d of the motor 65 is fitted in the hole 55g of the air cleaner box 55 such that the grommet 73 seals therebetween. Accordingly, it is possible to inhibit exit and entry of air from/to the inside of the air cleaner box 55 from the gap between the motor 65 and the air cleaner box 55.

In the second embodiment, as described above, the seal bearing 72 is fitted to a bearing groove 65b of the motor 65 including the output shaft 65a that extends from the outside to the inside of the air cleaner box 55. Further, the rubber-made grommet 73 is fitted around the protrusion 65c provided integrally with the body of the motor 65, and the protrusion 65c fitted with the grommet 73 is fitted into the hole 55g of the air cleaner box 55. As a result of adopting this structure, flow of air is inhibited in the gap between the output shaft 65a and the hole 55g of the air cleaner box 55. As a result, it is possible to inhibit the occurrence of interference of the flow of air that enters the engine 14 in the inside of the air cleaner box 55.

Note that, it is to be understood that all of the features of the embodiments disclosed here are merely examples, and in no way limit the invention. The scope of the invention is defined by the scope of the claims and not by the explanation of the above described embodiments. Further, the invention is understood to include structures that are equivalent in scope to the claims, and all modifications that come within the scope of the claims.

For example, in the examples of the above embodiments the invention is applied to a motorcycle. However, the invention is not limited to this structure, and may be applied to vehicles other than a motorcycle.

Furthermore, in the above embodiments, the invention is applied to a vehicle equipped with a 4-cylinder engine. However, the invention is not limited to this structure, and may be applied to a vehicle equipped with a multi-cylinder engine that is different to a 4-cyliner engine, or applied to a vehicle equipped with a single cylinder engine.

Moreover, in the above embodiments, pairs of the moveable funnels are integrated. However, the invention is not limited to this structure and three or more of the moveable funnels may be integrated. Further, a separate moveable funnel may be provided for each cylinder.

In addition, the above embodiments have a structure in which the moveable funnels are moved by the parallel linkage (the link mechanism) having the plurality of the linkage members. However, the invention is not limited to this structure and a link mechanism having a single arm (lever) may be used to move the moveable funnels.

What is claimed is:

1. A vehicle comprising:
an engine including a plurality of intake ports;
a plurality of fixed funnels through which air is delivered to the plurality of intake ports of the engine;
a plurality of moveable funnels positioned on an inlet side of the plurality of fixed funnels and arranged to selectively cooperate with the plurality of fixed funnels to deliver air to the plurality of intake ports of the engine;
a linkage arranged to moveably support the plurality of moveable funnels relative to the plurality of fixed funnels;
a fuel tank positioned rearward of the plurality of moveable funnels; and
a single drive source arranged to drive the linkage in order to move all of the plurality of moveable funnels, the single drive source being disposed on an opposite side of the plurality of movable funnels from the fuel tank.

2. The vehicle according to claim 1, further comprising a case in which the plurality of fixed funnels and the plurality of moveable funnels are disposed, wherein the linkage is positioned inside the case and the single drive source is positioned outside of the case.

3. The vehicle according to claim 2, wherein the single drive source includes a drive shaft that extends from outside the case to inside the case, further comprising a seal member that seals a gap between the drive shaft and the case.

4. The vehicle according to claim 3, wherein the seal member includes an elastic portion disposed in the gap between the drive shaft of the drive source and the case.

5. A vehicle comprising:
an engine including an intake port;
a fixed funnel through which air is delivered to the intake port of the engine;
a moveable funnel positioned on an inlet side of the fixed funnel and arranged to selectively cooperate with the fixed funnel to deliver air to the intake port of the engine;
a linkage arranged to movably support the moveable funnel relative to the fixed funnel;
a fuel tank positioned rearward of the moveable funnel;
a drive source arranged to drive the linkage in order to move the moveable funnel, the drive source being disposed on an opposite side of the movable funnel from the fuel tank; and
a case in which the fixed funnel and the moveable funnel are disposed, wherein the linkage is positioned inside the case and the drive source is positioned outside of the case; wherein
the case comprises a first section and a second section, further comprising an air filter within the case, the first section positioned generally on an upstream side of the air filter and the second section positioned generally on a downstream side of the air filter, wherein the drive source is positioned between the first section and the second section of the case.

6. A vehicle comprising:
an engine including an intake port;
a fixed funnel through which air is delivered to the intake port of the engine;
a moveable funnel positioned on an inlet side of the fixed funnel and arranged to selectively cooperate with the fixed funnel to deliver air to the intake port of the engine;
a linkage arranged to movably support the moveable funnel relative to the fixed funnel;
a fuel tank positioned rearward of the moveable funnel;

a case in which the fixed funnel and the moveable funnel are disposed, wherein the linkage is positioned inside the case and the drive source is positioned outside of the case; and
a drive source arranged to drive the linkage in order to move the moveable funnel, the drive source being disposed on an opposite side of the movable funnel from the fuel tank; wherein
the drive source includes a drive shaft that extends from outside the case to inside the case, further comprising a seal member arranged to seal a gap between the drive shaft and the case; and
the seal member includes a bearing, the bearing rotatably supporting the drive shaft of the drive source.

7. A vehicle comprising:
an engine including an intake port;
a fixed funnel through which air is delivered to the intake port of the engine;
a moveable funnel positioned on an inlet side of the fixed funnel and arranged to selectively cooperate with the fixed funnel to deliver air to the intake port of the engine;
a linkage arranged to movably support the moveable funnel relative to the fixed funnel;
a fuel tank positioned rearward of the moveable funnel;
a drive source arranged to drive the linkage in order to move the moveable funnel, the drive source being disposed on an opposite side of the movable funnel from the fuel tank; and
a case in which the fixed funnel and the moveable funnel are disposed, wherein the linkage is positioned inside the case and the drive source is positioned outside of the case; wherein
the drive source comprises a motor, the motor includes a motor drive shaft that extends from outside the case to inside the case, further comprising a lever that has a first end connected to the motor drive shaft and converts rotational motion of the motor drive shaft to linear motion.

8. The vehicle according to claim 7, further comprising a connecting rod that connects a second end of the lever to the linkage.

9. The vehicle according to claim 8, wherein the linkage is a parallel linkage including a plurality of linkage members that moveably support the moveable funnel such that it is capable of substantially parallel movement relative to the fixed funnel and wherein at least one of the linkage members has a first end that is connected to the connecting rod and a second end that is connected to the moveable funnel.

10. A vehicle comprising:
an engine including an intake port;
a fixed funnel through which air is delivered to the intake port of the engine;
a moveable funnel positioned on an inlet side of the fixed funnel and arranged to selectively cooperates with the fixed funnel to deliver air to the intake port of the engine;
a linkage arranged to movably support the moveable funnel relative to the fixed funnel;
a fuel tank positioned rearward of the moveable funnel; and
a drive source arranged to drive the linkage in order to move the moveable funnel, the drive source being disposed on an opposite side of the movable funnel from the fuel tank; wherein
the linkage is a parallel linkage including a plurality of linkage members arranged to moveably support the moveable funnel such that the moveable funnel is capable of substantially parallel movement relative to the fixed funnel.

11. The vehicle according to claim 10, wherein at high engine speeds the linkage members rotate in a first direction to move an outlet end of the moveable funnel to a first position in which the outlet end of the movable funnel is spaced from an inlet end of the fixed funnel, and wherein at low engine speeds the linkage members rotate in a second direction opposite of the first direction to move the outlet end of the moveable funnel to a second position in which the outlet end is in contact with the inlet end of the fixed funnel.

12. The vehicle according to claim 11, wherein an amount of rotation of the linkage members between the first and second positions is adjusted such that the position of the outlet end of the moveable funnel is in the same radial position relative to an axis defined by the inlet end of the fixed funnel, in both the first and second positions.

13. A vehicle, comprising:
an engine having an intake port;
a fixed funnel through which air is delivered to the intake port of the engine;
a moveable funnel positioned on the inlet side of the fixed funnel and that selectively cooperates with the fixed funnel to deliver air to the intake port of the engine;
an air cleaner box, an air cleaner and the fixed and moveable funnels being positioned within the air cleaner box, wherein the air cleaner box is generally U-shaped and defines a space between opposing side portions of the U-shaped air cleaner box;
a linkage that moveably supports the moveable funnel relative to the fixed funnel; and
a motor that drives the linkage in order to move the moveable funnel, at least a portion of the motor being disposed outside the air cleaner box and within the space.

14. The vehicle of claim 13, wherein the linkage is positioned within the air cleaner box.

15. The vehicle of claim 13, wherein a drive shaft of the motor is positioned at least partially within the air cleaner box.

16. The vehicle of claim 15, wherein the drive shaft extends from outside the air cleaner box to inside the air cleaner box through an opening in the air cleaner box, further comprising a seal member extending between the air cleaner box and the drive shaft and sealing the opening.

17. The vehicle of claim 16, wherein the seal member further comprises a bearing that rotatably supports the drive shaft.

* * * * *